United States Patent
Broadbent et al.

(10) Patent No.: US 9,948,610 B2
(45) Date of Patent: Apr. 17, 2018

(54) METHOD AND APPARATUS FOR ACCESSING THIRD-PARTY RESOURCES

(71) Applicant: Citrix Systems, Inc., Fort Lauderdale, FL (US)

(72) Inventors: Robert Emer Broadbent, Spring, TX (US); Tyrone F. Pike, Woodside, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/839,748

(22) Filed: Aug. 28, 2015

(65) Prior Publication Data

US 2016/0065563 A1 Mar. 3, 2016

Related U.S. Application Data

(60) Provisional application No. 62/044,043, filed on Aug. 29, 2014.

(51) Int. Cl.
*G06F 7/04* (2006.01)
*H04L 29/06* (2006.01)

(52) U.S. Cl.
CPC ...... *H04L 63/0281* (2013.01); *H04L 63/0807* (2013.01); *H04L 63/0884* (2013.01); *H04L 63/0428* (2013.01)

(58) Field of Classification Search
CPC ............. H04L 63/0281; H04L 63/0884; H04L 63/0807; H04L 63/0428
See application file for complete search history.

(56) References Cited

U.S. PATENT DOCUMENTS

| | | | |
|---|---|---|---|
| 7,370,015 B2 | 5/2008 | Gvily | |
| 7,836,493 B2* | 11/2010 | Xia | H04L 63/0281 726/9 |
| 8,397,059 B1* | 3/2013 | Ferguson | H04L 9/321 713/155 |
| 8,806,588 B2* | 8/2014 | Sorenson, III | H04L 63/0823 726/5 |
| 9,210,144 B2* | 12/2015 | Pearson | H04L 63/08 |

(Continued)

FOREIGN PATENT DOCUMENTS

| | | |
|---|---|---|
| EP | 1157344 B1 | 11/2002 |
| WO | WO 2000/073876 A9 | 12/2000 |

*Primary Examiner* — Khoi Le
(74) *Attorney, Agent, or Firm* — Foley & Lardner LLP; Christopher J. McKenna

(57) ABSTRACT

A method, system, and apparatus for providing a client access to third-party resources by utilizing third-party access tokens via a network gateway. The method can prevent the third-party access tokens from being exposed directly to the client environment. The client receives a gateway security credential, which encapsulates the third-party access token in an encrypted form. The client provides the gateway access token to the network gateway where the third-party access token is decrypted and then used to access the third-party resource. Client requests to the network gateway are executed using a custom API. The gateway relays the client requests to the appropriate third-party resources using the third-party-specific API with the decrypted third-party access token. Gateway access tokens are short-lived and can be renewed according to the client-environment life cycle.

17 Claims, 18 Drawing Sheets

(56) References Cited

U.S. PATENT DOCUMENTS

| | | | |
|---|---|---|---|
| 2009/0165110 A1* | 6/2009 | Becker | G06F 21/6218 726/9 |
| 2009/0193507 A1* | 7/2009 | Ibrahim | H04L 63/0807 726/9 |
| 2009/0199276 A1* | 8/2009 | Schneider | H04L 63/0815 726/5 |
| 2011/0030047 A1* | 2/2011 | Gao | G06F 21/335 726/9 |
| 2012/0144501 A1* | 6/2012 | Vangpat | H04L 63/108 726/28 |
| 2012/0159601 A1* | 6/2012 | Dalzell | G06F 21/335 726/9 |
| 2012/0221652 A1 | 8/2012 | Sainio et al. | |
| 2013/0047203 A1* | 2/2013 | Radhakrishnan | G06F 21/335 726/1 |
| 2013/0111543 A1* | 5/2013 | Brown | H04L 63/0884 726/1 |
| 2013/0269019 A1* | 10/2013 | Garmark | G06F 9/54 726/9 |
| 2014/0337954 A1* | 11/2014 | Ahmed | G06F 21/41 726/8 |
| 2015/0089617 A1* | 3/2015 | Sondhi | H04L 63/08 726/8 |
| 2015/0350186 A1* | 12/2015 | Chan | H04L 63/083 726/9 |

* cited by examiner

METHOD AND APPARATUS FOR ACCESSING THIRD-PARTY RESOURCES

BACKGROUND

As the number of remote users increases, remote desktop use has also increased. In addition, client use of third-party resource-provider tokens has increased. The use of third-party resource-provider tokens in an unsecure environment, such as an anonymous remote desktop, can result in breach of the token.

Some existing technologies provide proxy oriented types of services, which check an access control list to grant a user access. Some technologies describe a method of proxying a request, but do not replace authenticating information in requests after the user has been authenticated to the gateway. Some technologies describe encrypting profile information, but do not replace the originating client's credentials with credentials specific to the target resource. Some technologies describe scripting interactions while impersonating a user using scripts and additional information stored in a database, but do not disclose replacing authenticating information in the request based on who is the requesting principal. Some technologies describe using a user token to access a resource, but do not use an authenticated identity to provide functionality based upon a third-party token. Some technologies describe using access policies to determine if a user can access one or more communication endpoints, but do not augment a request with user-relevant authentication information for third-party resource-provider access. Some technologies describe using an authentication agent separate from the originating request, but do not augment a request with local authentication data to access a proxied resource. Some technologies describe exposing an activation key on a customer network, but do not discuss shielding third-party tokens from a user's environment.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The present disclosure generally relates to the field of network connectivity and Internet protocols and more particularly to managing access to networked resources. In particular, the present disclosure relates to token management for accessing third-party systems in preventing long-lived tokens from being compromised, allowing for more convenient access in a non-persistent environment, and providing the ability to access third-party resources through a network gateway that prevents the third-party access tokens from being accessible to the client environment.

In some embodiments, multiple third-party tokens are associated with a given identity token. Once authenticated to the client environment, the client has use of its associated third-party access tokens via the gateway without having to re-authenticate within the environment or with the third-party resource service, thereby simplifying access to third-party resources (e.g., files, web services, binary data, social networks, etc.) in a non-persistent environment.

In some embodiments, the network gateway uses a custom application programming interface (API) to access third-party resources. The network gateway can make requests with a gateway access token. The third-party access token can be encapsulated in the gateway access token. The third-party access token can then be used to access the appropriate third-party API for the method appropriate to the client-requested API.

In some embodiments, the network gateway uses a custom protocol that represents a desired collection of use cases to be translated into appropriate method calls for a particular third-party resource. This allows for the use of multiple incompatible third-party resource APIs by a client that uses a single custom gateway API. Further, this allows for additional incompatible third-party resource APIs via support by the network gateway without having to update the client custom API.

In some embodiments, the network gateway modifies a client request with different credentials, so the request is modified with a third-party token.

Figure 1:
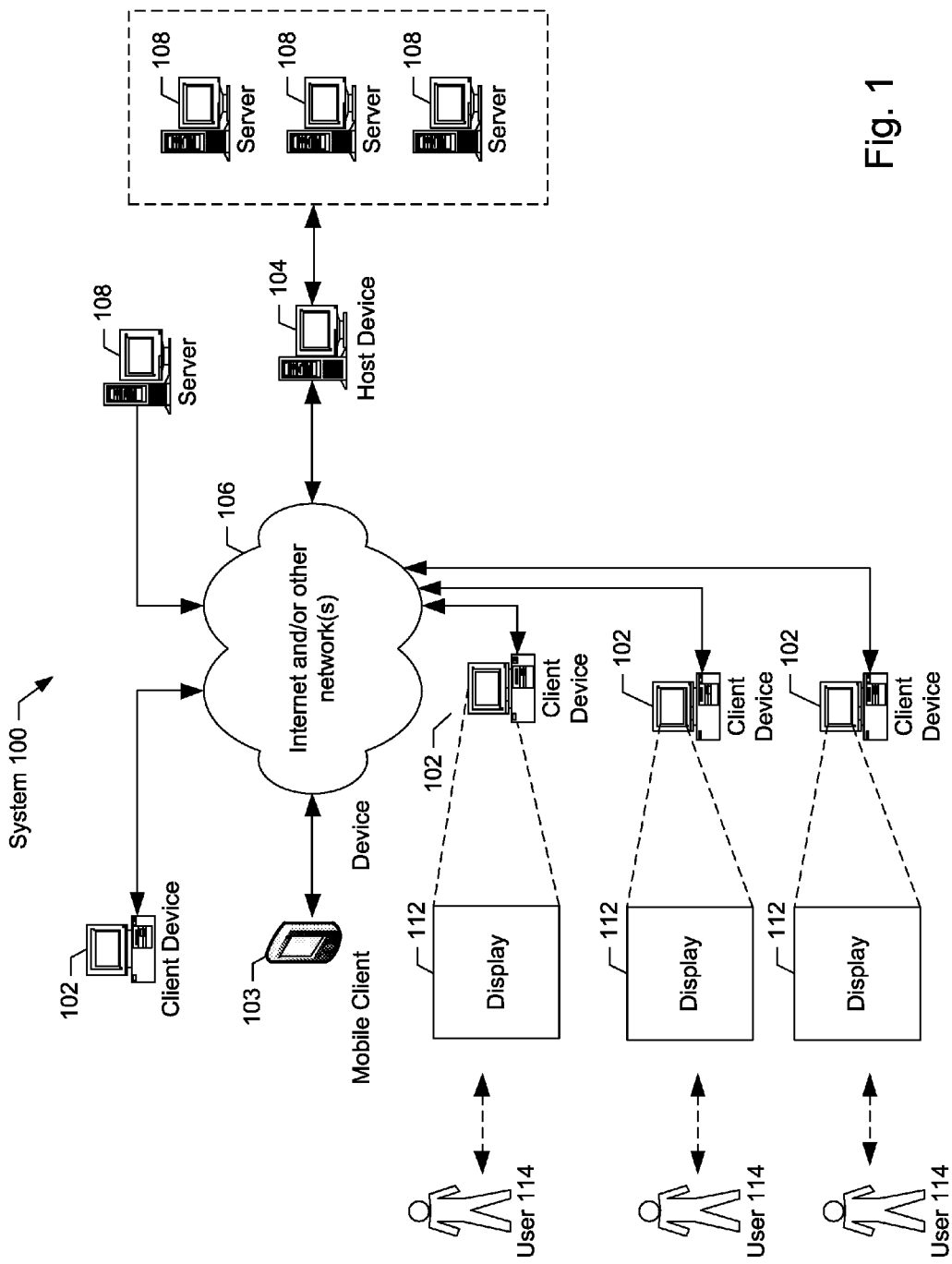
FIG. 1 is a high-level block diagram of an example communications system, consistent with embodiments of the present disclosure.

The present system can be readily realized in a network communications system. A high level block diagram of an example network communications system 100 is illustrated in FIG. 1. The illustrated system 100 includes one or more client devices 102, and one or more host devices 104. The system 100 can include a variety of client devices 102, such as desktop computers and the like, which typically include a display 112, which is a user display for providing information to users 114 of the network gateway, and various interface elements as will be discussed in further detail below. A client device 102 can be a mobile device 103, which can be a cellular phone, a personal digital assistant, a laptop computer, a tablet computer, a wearable (e.g., smart watch), etc. The client devices 102 can communicate with the host device 104 via a connection to one or more communications networks 106 (e.g., communication channels) such as the Internet or some other data network, including, but not limited to, any suitable wide area network or local area network. It should be appreciated that any of the devices described herein can be directly connected to each other instead of over a network. Typically, one or more servers 108 can be part of the network communications system 100, and can communicate with host servers 104 and client devices 102.

One host device 104 can interact with a large number of users 114 at a plurality of different client devices 102 (also referred to as clients). Accordingly, each host device 104 is typically a high end computer with a large storage capacity, one or more fast microprocessors, and one or more high speed network connections. Conversely, relative to a typical host device 104, each client device 102 typically includes less storage capacity, a single microprocessor, and a single network connection. It should be appreciated that a user 114 as described herein can include any person or entity that uses the presently disclosed network gateway and can include a wide variety of parties.

Typically, host devices 104 and servers 108 store one or more of a plurality of files, programs, databases, and/or web pages in one or more memories for use by the client devices 102, and/or other host devices 104 or servers 108. A host device 104 or server 108 can be configured according to its particular operating system, applications, memory, hardware, etc., and can provide various options for managing the execution of the programs and applications, as well as various administrative tasks. A host device 104 or server can interact via one or more networks with one or more other host devices 104 or servers 108, which may be operated independently. For example, host devices 104 and servers 108 operated by a separate and distinct entities can interact together according to some agreed upon protocol.

Figure 2:
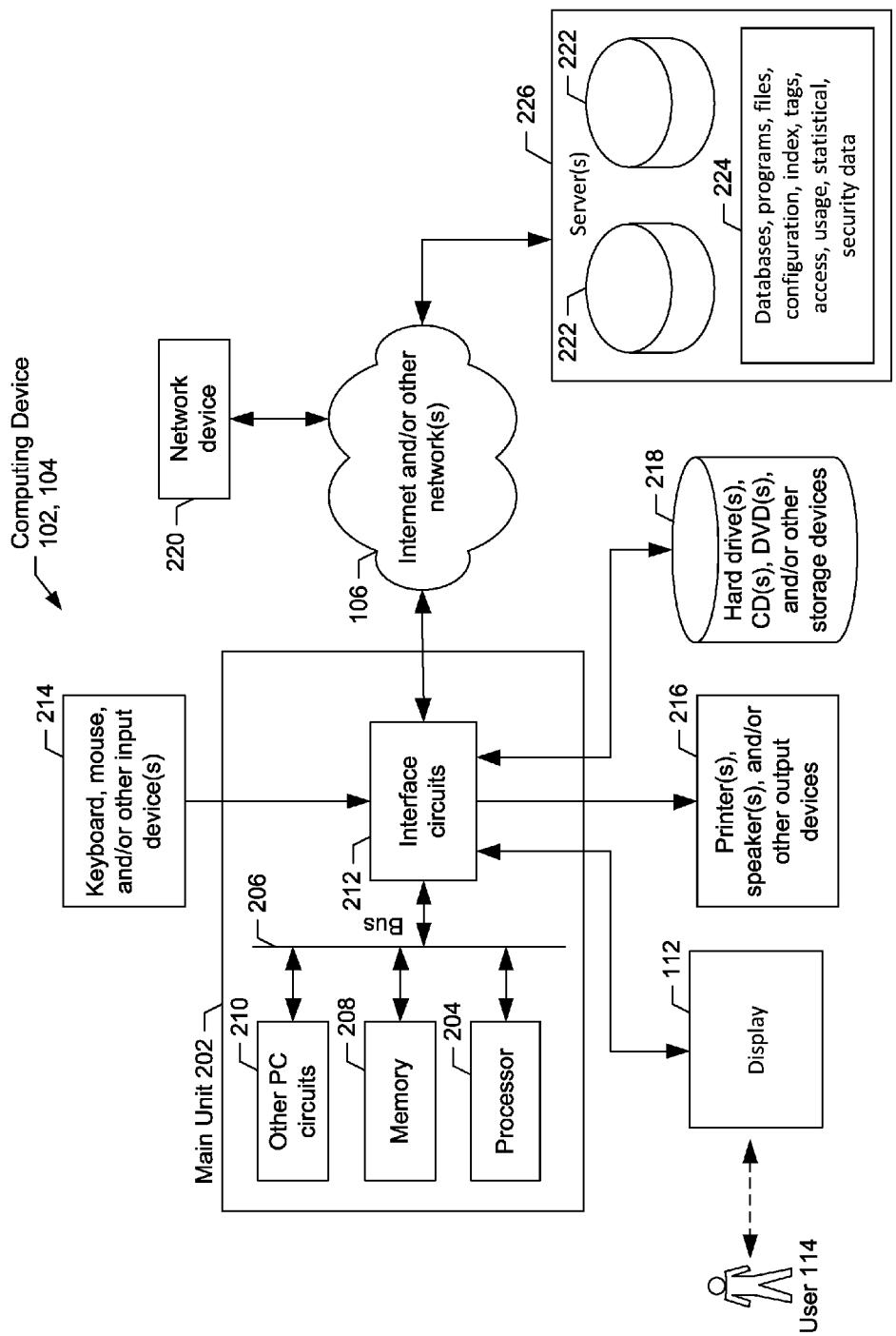
FIG. 2 is a more detailed block diagram showing one example of a computing device, consistent with embodiments of the present disclosure.

A detailed block diagram of the electrical systems of an example computing device (e.g., a client device 102, and a host device 104 is illustrated in FIG. 2). In this example, computing device 102 and host device 104 includes a main unit 202, which preferably includes one or more processors 204 electrically coupled by an address/data bus 206 to one or more memory devices 208, other computer circuitry 210, and one or more interface circuits 212. The processor 204 can be any suitable processor, such as a microprocessor. The memory 208 preferably includes volatile memory and non-volatile memory. In some embodiments, the memory 208 stores a software program that interacts with the other devices in the system 100 as described below. This program can be executed by the processor 204 in any suitable manner. Memory 208 can be part of a "cloud" such that cloud computing can be utilized by a computing devices 102, 104. Memory 208 can also store digital data indicative of documents, files, programs, web pages, etc. retrieved from a computing device 102, 104 and/or loaded via an input device 214.

Interface circuit 212 can be implemented using any suitable interface standard, such as an Ethernet interface and/or a Universal Serial Bus (USB) interface. One or more input devices 214 can be connected to interface circuit 212 for entering data and commands into main unit 202. For example, input device 214 can be a keyboard, mouse, touch screen, track pad, track ball, isopoint, image sensor, character recognition, barcode scanner, and/or a voice recognition system.

One or more displays 112, printers, speakers, and/or other output devices 216 can also be connected to the main unit 202 via the interface circuit 212. Display 112 can be a cathode ray tube (CRTs), a liquid crystal display (LCD), or any other type of display. Display 112 generates visual displays generated during operation of the computing device 102, 104. For example, display 112 can provide a user interface, which will be described in further detail below, and can display one or more web pages received from a computing device 102, 104. A user interface can include prompts for human input from a user 114 including links, buttons, tabs, checkboxes, thumbnails, text fields, drop down boxes, etc., and can provide various outputs in response to the user inputs, such as text, still images, videos, audio, and animations.

One or more storage devices 218 can also be connected to main unit 202 via interface circuit 212. For example, a hard drive, CD drive, DVD drive, and/or other storage devices can be connected to the main unit 202. The storage devices 218 can store any type of data, such as pricing data, transaction data, operations data, inventory data, commission data, manufacturing data, image data, video data, audio data, tagging data, historical access or usage data, statistical data, security data, etc., which can be used by computing device 102, 104.

Computing device 102, 104 can also exchange data with other network devices 220 via a connection to the network 106. Network devices 220 can include one or more servers 226, which can be used to store certain types of data, and particularly large volumes of data which can be stored in one or more data repository 222. Server 226 can include any kind of data 224 including databases, programs, files, libraries, pricing data, transaction data, operations data, inventory data, commission data, manufacturing data, configuration data, index or tagging data, historical access or usage data, statistical data, security data, etc. Server 226 can store and operate various applications relating to receiving, transmitting, processing, and storing the large volumes of data. It should be appreciated that various configurations of one or more servers 226 can be used to support and maintain the system 100. For example, servers 226 can be operated by various different entities, including automobile manufacturers, brokerage services, automobile information services, etc. Also, certain data can be stored in a client device 102 which is also stored on the server 226, either temporarily or permanently, for example in memory 208 or storage device 218. The network connection can be any type of network connection, such as an Ethernet connection, digital subscriber line (DSL), telephone line, coaxial cable, wireless connection, etc.

Access to a computing device 102, 104 can be controlled by appropriate security software or security measures. An individual users' 114 access can be defined by the computing device 102, 104 and limited to certain data and/or actions. Accordingly, users 114 of the system 100 can be required to register with one or more computing devices 102, 104. In some embodiments, registered users 114 can request or manipulate data, such as submitting requests for pricing information or providing an offer or a bid.

As noted previously, various options for managing data located within the computing device 102, 104 and/or in a server 226 can be implemented. A management system can manage security of data and accomplish various tasks such as facilitating a data backup process. A management system can be implemented in a client device 102, a host device 104, and a server 226. The management system can update, store, and back up data locally and/or remotely. Further, in some embodiments, a management system can remotely store data using any suitable method of data transmission, such as via the Internet and/or other networks 106.

It will be appreciated that all of the disclosed methods and procedures described herein can be implemented using one or more computer programs or components. These components can be provided as a series of computer instructions on any non-transitory computer-readable medium, including RAM, ROM, flash memory, magnetic or optical disks, optical memory, floppy disk, a flexible disk, hard disk, solid state drive, magnetic tape, or any other magnetic data storage medium, a CD-ROM, any physical medium with patterns of holes, a cache, a register, any other memory chip or cartridge, or other storage media, and networked versions of the same. The instructions can be configured to be executed by a processor, which when executing the series of computer instructions performs or facilitates the performance of all or part of the disclosed methods and procedures.

The client environment can include virtual desktops and native desktops.

After entering the client environment, the client can receive an identity token that signifies the holder of the identity token has a specific identity or role.

In some embodiments, a client uses an API of the token vault to exchange its identity token for a list of available third-party access tokens. This list represents the third-party tokens that have been persisted in the token vault with the given identity association, the service type, and the associated identity label.

A client can select from the list of third-party tokens the third-party resource to be accessed. The client accesses an API on the token-vault and provides the identity of the target third-party resources and the client identity token. In exchange the token vault provides a gateway access token that includes an encrypted form of the third-party access token.

In some embodiments, the gateway access token includes the encrypted third-party access token, user and/or client identifying information, the token expiration, and a digital signature that can be verified by the gateway. The third-party token can be encrypted using a key held by the gateway service.

The client can use the gateway access token that it received for a target third-party resource when it access the gateway on behalf of the target third-party resource. The client can access the API method on the gateway for a use case to be executed on a target third party and includes the gateway access token in the API method call.

In some embodiments, after gateway API method invocation, the gateway confirms that the integrity of the gateway access token via the cryptographic signature and then the gateway confirms that the gateway access token has not expired. If the access token has expired, the gateway returns the appropriate response.

After a gateway API method is invoked for verified, non-expired tokens, the gateway can decrypt the third-party access token. The type of third-party access token can indicate the targeted third-party resource to the gateway service. The gateway can access the appropriate third-party API as determined by the targeted third-party resource.

In some embodiments, the gateway invokes the third-party method appropriate to the gateway API invoked by the client. Gateway APIs can represent certain use cases. The network gateway can be responsible for calling the appropriate third-party API as determined by the signified use case.

The gateway can receive the third-party service result. The result can be transformed into a result compatible with the gateway custom API results set. The result set format is appropriate to the gateway API invoked by the client. The translated API result set is returned to the client.

Client requests and gateway responses can include data streams that represent files, web services, or any other web resource.

Expired gateway-access tokens can be exchanged for a new, non-expired token to access the same third-party resource. Tokens can be renewed if the token renewal service determines that phase of the client environment life cycle is appropriate. The token renewal service identifies the current phase of the client environment life cycle by calling a separate service API.

In some embodiments, the network gateway is a network service that authenticates a given security principal and then replaces the original credentials with authenticating information specific to the target resource prior to relaying the request to the target resource. The authentication information can be associated with the originating principal and retrieved from a separate data store. The additional authenticating information may not be available to the originating principal, thus preventing the exposure of long-term authenticating information to the originating environment. The original requests can have the gateway authenticating information removed, so that it is not visible to, or accessible by, the target resource. The originating principal can be provided with an identifying token that is short-lived and revocable in order to authenticate it with the gateway. This provides greater control regarding management of the token lifecycle in a less secure environment.

In some embodiments, the network gateway is used in providing a virtual desktop service. For example, a client can remotely access an application execution environment, and from the application execution environment desire to access third-party resource-provider data. From the viewpoint of the network gateway, the client is an anonymous desktop that is logging-in. Thus, it is desirable to ensure that any information, including valuable, third-party tokens, remains secure, while still providing the client the benefit of the third-party token.

Services can also use a network gateway to access a third-party resource provider. For example, service synchronizing a collection of data or metadata can access data stored with a third-party resource provider.

In some embodiments, a gateway client is used in a virtual desktop infrastructure (VDI). The gateway client can initiate a request to the gateway. In some embodiments, the gateway provides a volume for delivering on-demand data to virtual applications in the VDI. Clients can access the VDI environment using software that provides a graphical interface to a computer over a network. The VDI environment can be a network-based service that accepts requests for the delivery of a graphical interface to remote software. In some embodiments, a client can use a virtual desktop without at least some of the client's data (e.g., user or client data) initially available. The gateway client (e.g., network gateway 404 of FIG. 4) can be used in conjunction with a storage gateway (e.g., storage gateway 444 of FIG. 4) to synchronize metadata and file contents provided by third-party resource providers. In some embodiments of the present disclosure, the virtual desktop infrastructure in conjunction with the virtual applications is an example of an application execution environment.

Application execution environments include environments in which the gateway client can be used. This includes applications and virtual-desktop-infrastructure-based desktops, native desktop, and mobile platforms.

The gateway client can be used in non-application execution environments where access to gateway-provided resources is needed. Some embodiments of non-application execution environments are server environments used for serving common internet file system (CIFS) and network file system (NFS) data, which use the gateway client and storage gateway to access storage resources.

In some embodiments, the network gateway system uses two types of tokens, gateway access tokens and third-party tokens. Third-party tokens can be OAuth tokens. The third-party token can be a permanent, persistent token. Alternatively, the third-party token expires. The gateway access token expires typically when the client's virtual desktop session ends. The gateway access token's lifecycle in some embodiments is associated with to the client's session length. It should be appreciated that the third-party token can last longer than the gateway access token.

After the session ends, the gateway access token can be revoked, but the third-party token does not need to be revoked because its contents have not been exposed to any unsecure environment. For example, to revoke the gateway access token, the gateway access token can be invalidated. The network gateway may no longer acknowledge the gateway access token once a client session is finished. In some embodiments, a local or gateway access token is tied to the client for one session.

For example, a client can log into a webpage, and the webpage allows the client to log in into a remote desktop. A company or organization with which a user is affiliated can provide a plurality of desktops (e.g., clients) that are waiting to run applications, and those desktops can be better at running those applications than the user's computer. Or, a user may wish to use his or her company's remote services from home. In some embodiments, the client can remotely log in using Remote Desktop (RDP) on Windows™. For example, a company or organization can provide a desktop in the cloud (e.g., over the Internet) that runs a target application, and the user by logging-in has attached to that desktop.

The client logging in for the virtual session can receive a token, e.g., a gateway access token. It may be desirable for this gateway access token expire when the session ends. Although, in some embodiments, the client may require access to third-party resource providers when logged into its session. Those third-party resource providers can require the use of third-party tokens. In some embodiments, unlike a gateway access token, it is desirable to maintain third-party tokens for a longer lifecycle. For example, it can be difficult or burdensome to re-authenticate third-party tokens on a per-session basis. It may be desirable to instead manage and securely store third-party tokens without re-authenticating for each use and/or session. In some embodiments, the third-party tokens are OAuth tokens.

In some embodiments, a network gateway receives a local token that verifies the client's identity, e.g., the gateway access token, and in exchange for this information, the network gateway retries the appropriate third-party token from the token vault. The token from the originating environment can be removed and replaced with the third-party token.

It should be appreciated that with this arrangement, a series of anonymous clients can use that a third-party resource provider's token that is stored on the server without giving out that third-party resource provider token information to the client. The third-party authenticating is kept separate from the local or client environment. In some embodiments, the local token can provide local identifying information, even though the identity can exist on different computers (e.g., a client can log in at different times and attach to a different remote desktop).

The network gateway system can be advantageously used to access third-party resource providers, file hosting services, cloud storage services, online file storage providers, cyberlockers, file sharing services, file synchronization services, file storage services, file storage and synchronization services, document collaboration services, object-based storage, or other network services with file storage capabilities, such as social networks. In some embodiments, the network gateway system can be used for other web services that use long-lasting, security-credential-based authentication.

In some embodiments, it may be advantageous to only provide to a desktop or client the data that the third-party token provides, without giving the third-party token to a desktop.

For example, a user can log in from any client, and the network gateway provides a volume or drive to access a variety of different third-party resource provider services. Advantageously, each time the user logs in, the client can have persistent access to the third-party resource providers. For example, once a user has been verified as a Dropbox™ user, and has received a Dropbox™ token that is stored in the token vault, the client does not have to be re-authenticated by Dropbox™. The user's identity can be authenticated by a federated identity provider or the organization providing the virtual application.

In the network gateway system, re-authenticating the third-party or network token in other locations is not necessary.

In some embodiments, any client with the third-party or network token can access the network data in a reusable manner. Thus it is advantageous to protect the third-party token and only expose it in secure, trusted environments.

In some embodiments, obtaining a gateway access token including an encrypted third-party token requires a digital signature.

In some embodiments, the network gateway system provides token management services, such as a token vault.

In some embodiments, the token vault contains tokens for a specific user, collection of users, or roles. The appropriate user or role is indicated by the identity token the client received when the user authenticated themselves to the environment. The client can use the identity token to access an API on the token vault, which returns the list of labels of available tokens associated with the given user identity or role. A token can be associated with more than one user or role.

The network gateway's service APIs can be Representational State Transfer (REST) style and can be accessed using REST-style protocols. Alternate remote procedure call (RPC) protocols can also be used.

The custom API used by the client to access the storage gateway includes methods that represent common storage-related use cases. These include:
Directory listing
Delete a directory
Delete a file
Rename a file or directory
Get file metadata
Get file version metadata
Update a file
Download a file
Get a URI to access a file—this URI can be secret and/or temporarily valid
Get changes to a directory
Get changes to a collection of files.

The token vault manages a collection of third-party service tokens that can expire at varying times. The token vault regularly reviews each token to determine if it will expire within a specific period of time. Alternatively, the token vault can regularly review an index to determine if a token will expire within a specific period of time. If a token will expire within a specific time, the token vault can attempt to refresh the third-party service token if an automatable refresh process is available for a given third-party service. A refreshed access token from a third-party service should represent the current privileges of the third-party identity with an expiration date that occurs after that of the existing token. After the third-party service token is refreshed, the token vault can replace the existing token with the refreshed token.

The storage gateway generates events whenever an API method is called. These events are persisted in an event log for a specific period of time. These events can be consumed by other processes or services either via RPC callbacks or polling of the event log.

Gateway API method invocations and the operations of background processes, such as the third-party token-refresh process log their events to a system log.

In some embodiments, the network gateway grants access to a single user ID, so that the client can obtain access to a variety of third-party storage systems. The network gateway identifies the client locally, and then once that client is identified and authenticated locally, the network gateway grants that client access to data from a variety of third parties. Access to that data from the third parties would typically require a token (e.g., the file storage or third-party token), but the network gateway advantageously shields that token from the client. Because the file storage token is not exposed to any of the clients, it is advantageously possible to continue reusing that file storage token instead of having to get a new token every time.

In some embodiments, the client enters the virtual desktop. The user has authenticated the client by using an initial login. The network gateway system uses that login data to then access the third-party tokens. It should be appreciated that the user ID has been established within the virtual desktop environment, and the network gateway takes a user token and some other data to access the token vault. On behalf of that client, the network gateway can then access the third party's data without actually giving the client that token.

It should be appreciated that the network gateway service is acting on behalf of the client. In other words, the client obtains an identifying user token, which is then taken to the network gateway. The network gateway can then take that user token and grant the client access to the file storage tokens.

It should be appreciated that in some embodiments, the process begins in a "less trusting" environment. The client environment may be less trust-worthy, so the network gateway system ensures that the file storage token is not exposed in that less-trusted environment. The network gateway thus can provide to a client access to third-party data, which requires a third-party token, without sharing that token.

Thus a client obtains a user token that uniquely identifies that client. The token can be obtained in any one of a variety of different ways, such as for example, based on information provided by the user at log in, or for example from an authenticating service. The network gateway recognizes and acknowledges the client based on the user token, and accesses the file storage tokens that have been previously associated with the user ID and stored/managed in the token vault, and provides access to data from those third parties.

In some embodiments, the network gateway obtains the data on behalf of the client without exposing the third-party token to the client by implementing a custom protocol. When the client requests information from the different file storage systems, the client sends the request via custom protocol. The custom protocol can define how the client communicates with the network gateway. The network gateway converts the custom protocol into a specific protocol that is specific to the target third-party. For example, if a client requests access to five different third parties, for each request, the network gateway would translate the custom protocol to a specific protocol for each of those five third parties. The network gateway can thus convert a custom protocol to a specific third-party protocol that is specific for each third-party.

The network gateway can also replace the identification information in the specific protocol, removing all of the identifying information. Thus, the network gateway shields the client's local environment information so that a third-party resource provider cannot access information from the client's local environment. Note that herein, the resources in a third-party resource provider can include storage, but not necessarily. In various embodiments herein, although the term storage is used, any type of resource can be used. The network gateway replaces the local ID with a persistent token and rewrites the request so that the request is specific for that third-party.

The network gateway can be a custom device, but alternatively could be implemented as a computer or node in a network having the described functionality.

Figure 3A:
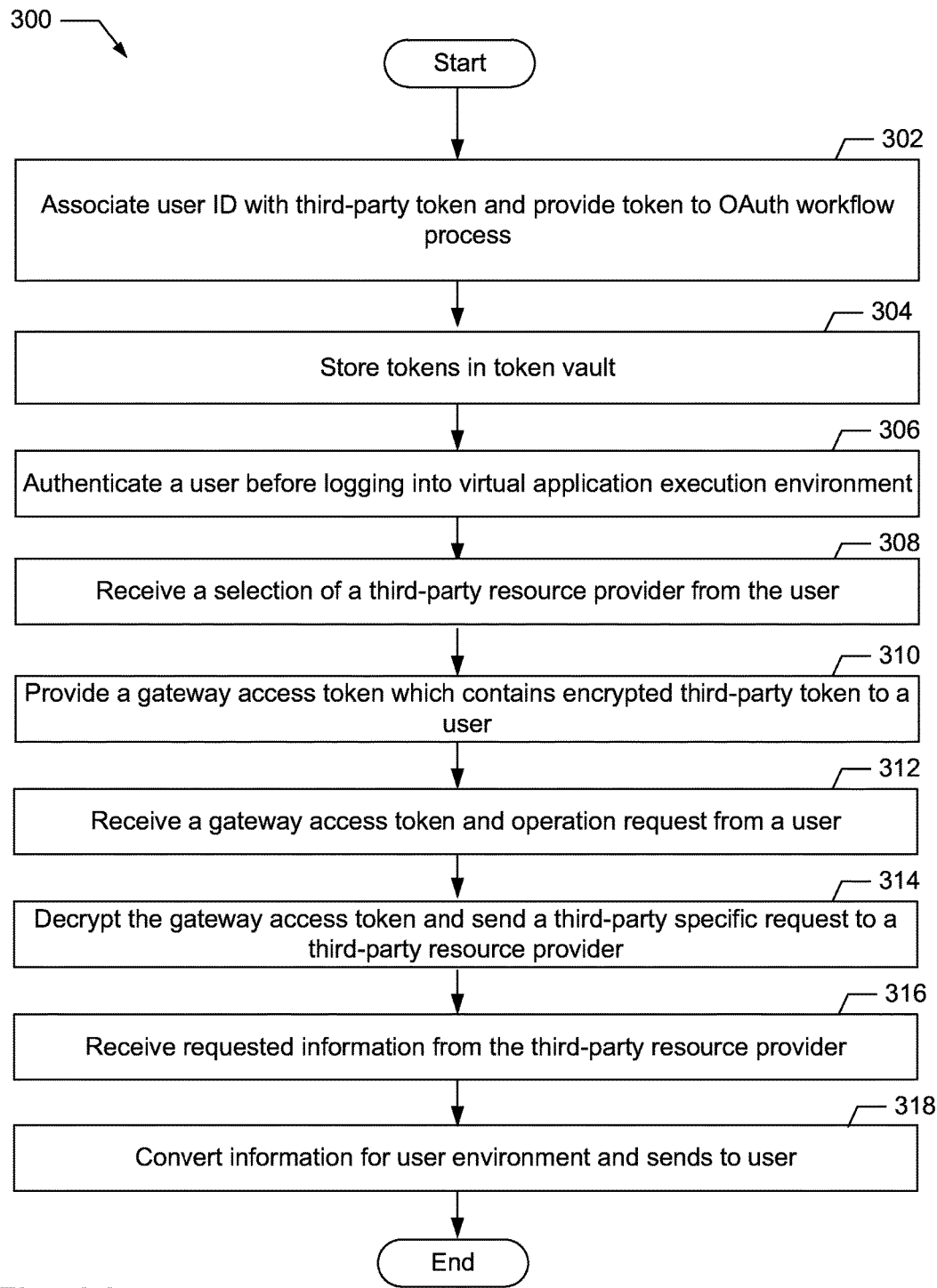
FIG. 3A is a flowchart of an example process for accessing third-party resources, consistent with embodiments of the present disclosure.

A flowchart of an example process 300 for accessing third-party resources is illustrated in FIG. 3A. While the flowchart discloses the following steps in a particular order, it will be appreciated that at least some of the steps can be moved, modified, or deleted where appropriate, consistent with the teachings of the present disclosure. The accessing of third-party resources can be performed in full or in part by a network gateway (e.g., network gateway 404 of FIG. 4). In some embodiments, the process 300 is embodied in one or more software programs which is stored in one or more memories and executed by one or more processors.

Although the process 300 is described with reference to the flowchart illustrated in FIG. 3A, it will be appreciated that many other methods of performing the acts associated with process 300 can be used.

In general, the process 300 provides a client with secure access to a third-party resource provider. In some embodiments, the client can obtain access to a third-party token. For example, a client can access a third-party token using OAuth, as shown at step 302. At step 302, a user identifier (ID) (e.g., a client identifier) is associated with a third-party token and the third-party token is provided to an authorization process (e.g., OAuth). At step 304, the network gateway stores the token in a token vault (e.g., Token Vault 448 of FIG. 4, Token Management Service of FIG. 17, etc.). It is contemplated that a token vault associated with the network gateway stores a plurality of third-party tokens for various third-party resource providers, which in some embodiments a client can select from. In some embodiments, a given user identity within a client environment can have one or more third-party tokens associated with the user identity. The tokens can be held in a token vault.

In some embodiments, the third-party access tokens are acquired in advance of their use and persisted in the token vault on behalf of a particular identity (e.g., user/client) within the environment. Third-party access tokens are acquired via the method required by a particular third-party resource. Different third-party resources can have different mechanisms and methods for granting third-party access tokens. A client may have collected a variety of different tokens in different ways, each being associated with that client and stored in the token vault accessible to the network gateway.

In some embodiments, a client begins an anonymous session by entering into a virtual application. The client may have previously been associated with tokens stored in the token vault. The token vault can associate many different tokens to one user ID. It can also associate many different IDs with many different tokens, meaning multiple clients could potentially use the same third-party token.

At step 306, a user/client can be authenticated, for example, by a federated ID service provider. A federated ID service provider can be a web resource such as Google™ or Facebook™. At step 308, a selection of a third-party resource provider is received. For instance, a user/client may decide to use a third-party resource provider such as Google™ or Facebook™. In some embodiments, a user can select which third-party resource providers he or she wishes to access in a particular session. At step 310, the network gateway provides a gateway access token that contains the encrypted third-party token to a user/client.

At step 312, the gateway receives an access token from a client and an operation request to the network gateway. In some embodiments, a client cannot access the token from a third-party resource provider. At step 314, the network gateway can decrypt the gateway access token and send a third-party specific request to the third-party resource provider. At step 316, the network gateway receives the requested information from the third-party resource provider. At step 318, the network gateway converts information for the client environment and sends to the client.

It should be appreciated that in process 300, the client is able to access data from a third-party resource provider without the third-party resource provider's token being unsecurely available in the client's local environment.

Figure 3B:
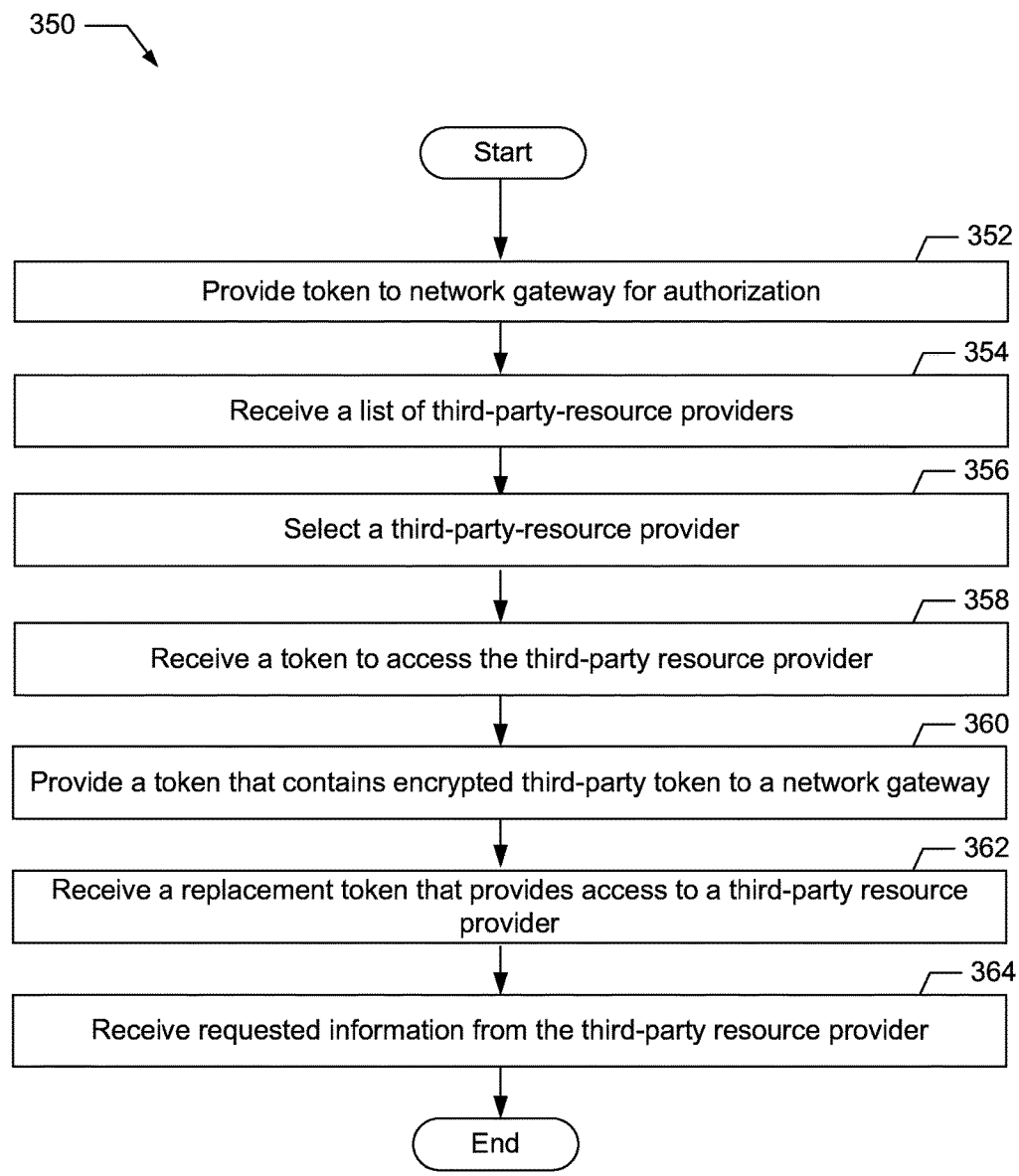
FIG. 3B is a flowchart of an example process for accessing third-party resources, consistent with embodiments of the present disclosure.

A flowchart of an example process 350 for accessing third-party resources is illustrated in FIG. 3B. While the flowchart discloses the following steps in a particular order, it will be appreciated that at least some of the steps can be moved, modified, or deleted where appropriate, consistent with the teachings of the present disclosure. In example process 350, accessing of third-party resources can be performed in full or in part by a client (e.g., application execution environment 402 of FIG. 4). In some embodiments, the process 350 is embodied in one or more software programs which is stored in one or more memories and executed by one or more processors. Although the process 350 is described with reference to the flowchart illustrated in FIG. 3B, it will be appreciated that many other methods of performing the acts associated with process 350 can be used.

Figure 4:
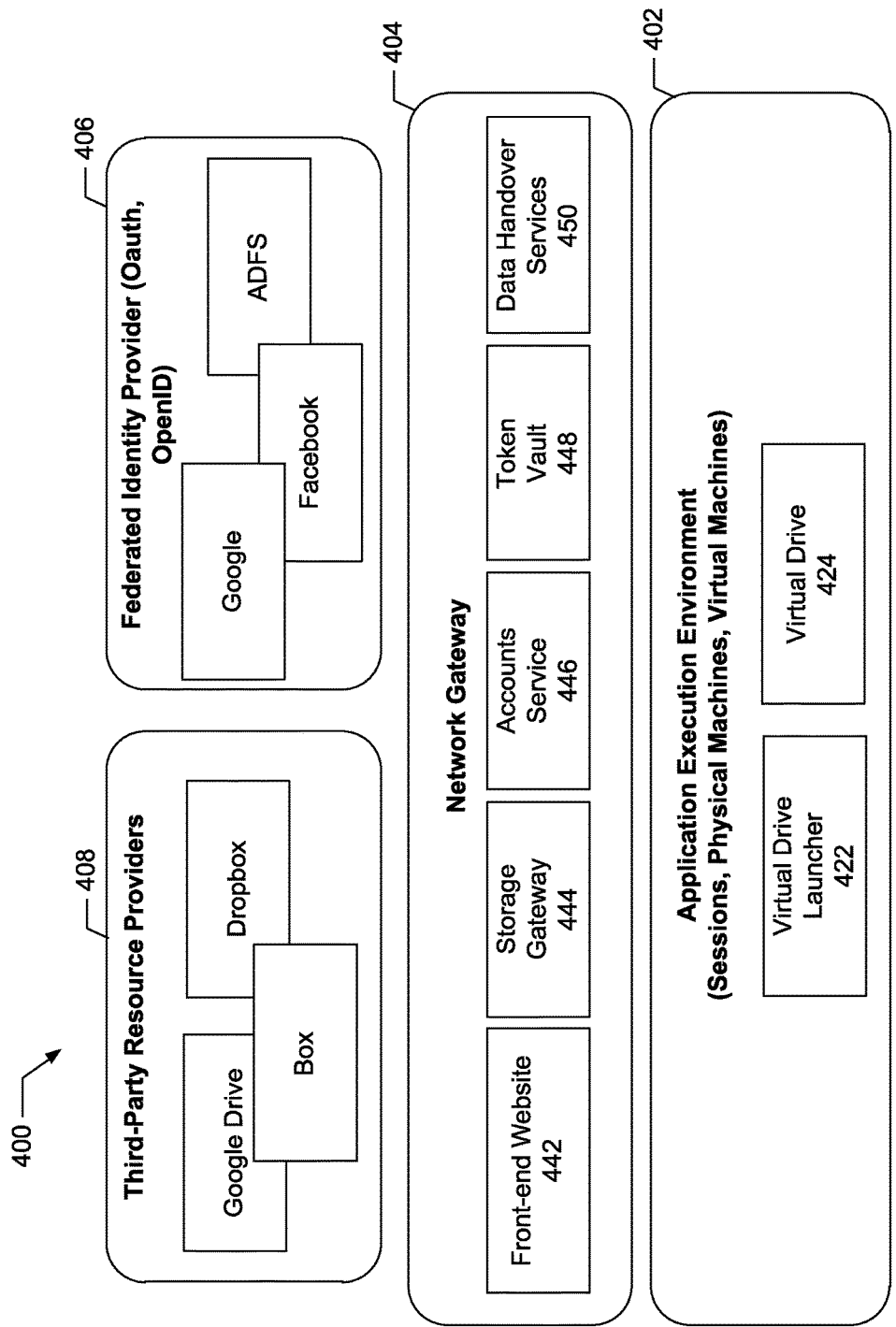
FIG. 4 is a block diagram of an example environment of the network gateway system, consistent with embodiments of the present disclosure.

In general, the process 350 provides a client with secure access to a third-party resource provider via a network gateway (e.g., gateway 404 of FIG. 4). At step 352, a user identifier (ID) (e.g., a client identifier) is provided to a network gateway for an authorization process (e.g., OAuth). In some embodiments, a network gateway can use the provided identifier (e.g., token) to a token management service (e.g., a token vault), such that the network gateway can acquire a second token to access a third-party resource provider. In some embodiments, a client cannot access a token management system.

At step 354, a list of a third-party resource provider is received. For instance, a user/client may decide to use a third-party resource provider such as Google™ or Facebook™. In some embodiments, the client can receive from a client a selection of which third-party resource providers he or she wishes to access in a particular session. At step 356, a client can select a third-party resource provider. After a selection of a third-party resource provider is made, at step 358 a client can receive a second token to access a third-party resource provider. At step 360, a client can be authenticated by providing a token that includes an encrypted third-party token to a network gateway, which decrypts the token such that the client can access the third-party resource, such as a federated ID service provider. In some embodiments, a network gateway may replace the first client token with the second token that allows access to the third-party resource provider. At step 362, the replacement token is received by the client, providing.

At step 364, the client receives requested information from the third-party resource provider, which can be transmitted via a network gateway. In some embodiments, if a session has not ended, a client may be able to continue to communicate with the third-party resource provider without needing a gateway to access a token management system each time.

FIG. 4 is an example environment block diagram showing various components that work together to provide a client access to third-party resources, consistent with various embodiments. It provides an overall diagram 400. FIG. 4 illustrates an application execution environment 402. Diagram 400 also includes network gateway 404, an identity provider 406, and a third-party resource provider 408. A client wishing to access third-party resource providers 408 can do so via network gateway 404, as discussed below. The client, in this example, is illustrated as an application execution environment 402 in diagram 400. In some embodiments, before a client (e.g., a user) can access a third-party token, a client can be uniquely identified. For example, the network gateway can use a federated identity provider 406.

In some embodiments, network gateway 404 includes an accounts service module 446, which associates a unique client ID with the federated ID. For example, a company might provide all of its employees with user IDs. Any one of those employees can act as a client requesting to access third-party resource providers 408. The company, in turn, would desire to ensure that the client (or user) logging in is an authenticated client. Thus, the accounts service 446 module associates the federated ID with a unique company ID. The user ID can have third-party resource providers 408 associated with that user ID in the token vault, discussed below. In other words, the client that logs into the virtual application environment is verified by the network gateway 404, and after the user ID is verified, that user ID can access third-party resource providers 408 associated with that user ID. It should be appreciated that token vault 448, discussed below, includes third-party tokens that have already previously been associated with a user ID.

Referring back to FIG. 4, FIG. 4 illustrates different components used in and with the network gateway 404. The virtual drive 424 is an example of a virtual drive, or volume, that can access the third-party data (e.g., within third-party resource providers 408). In some embodiments, virtual drive launcher 422 sets up virtual drive 424. Launcher 422 and the virtual drive are part of application execution environment 402.

In some embodiments, front-end website 442 is not part of network gateway 404. Instead, front-end website 442 is accessed before a client enters application execution environment 402, and front-end website 442 is where the client (e.g., a user) chooses which third-party resource providers 408 he or she wants to access. Some third-party resource providers 408 can require a client (e.g., a user) to make that decision before entering application execution environment 402. But, in some embodiments, a client can log into application execution environment 402 before a decision as to which third-party providers is made. In that case, front-end website 442 would appear as part of the network gateway's account service 446 services.

Figure 5:
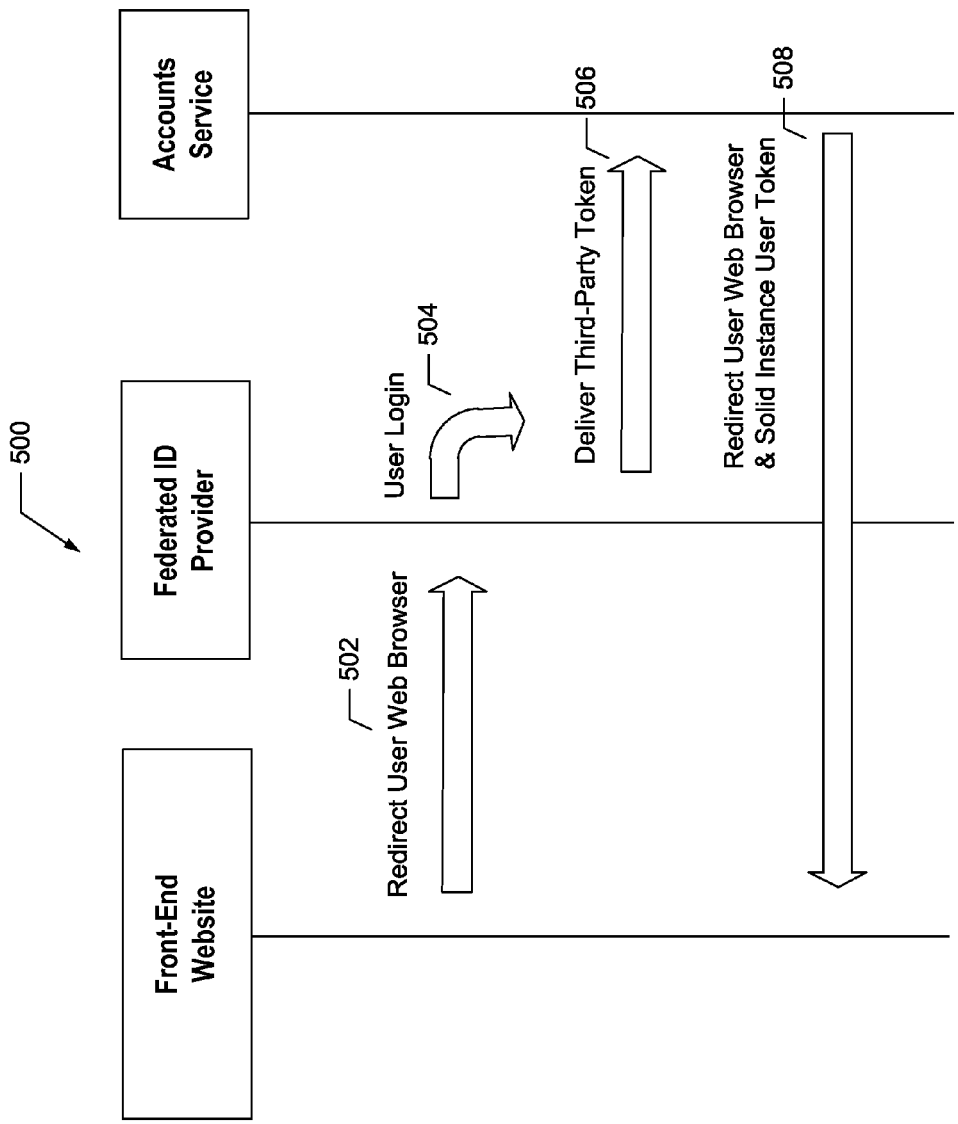
FIG. 5 is an example process for authenticating a client, consistent with embodiments of the present disclosure.

FIG. 5 is an example process for identifying a client from a front-end website. In step 502, the front-end website (e.g., front-end website 442 of FIG. 4) redirects the client's web browser to a federated ID provider, such as Facebook, where the client can log in, as shown in step 504. After the client is logged in, the client is given a third-party token, which is in turn given to account services, as shown in step 506. The third-party token is then sent back to the front-end website, as shown in step 508.

Figure 6:
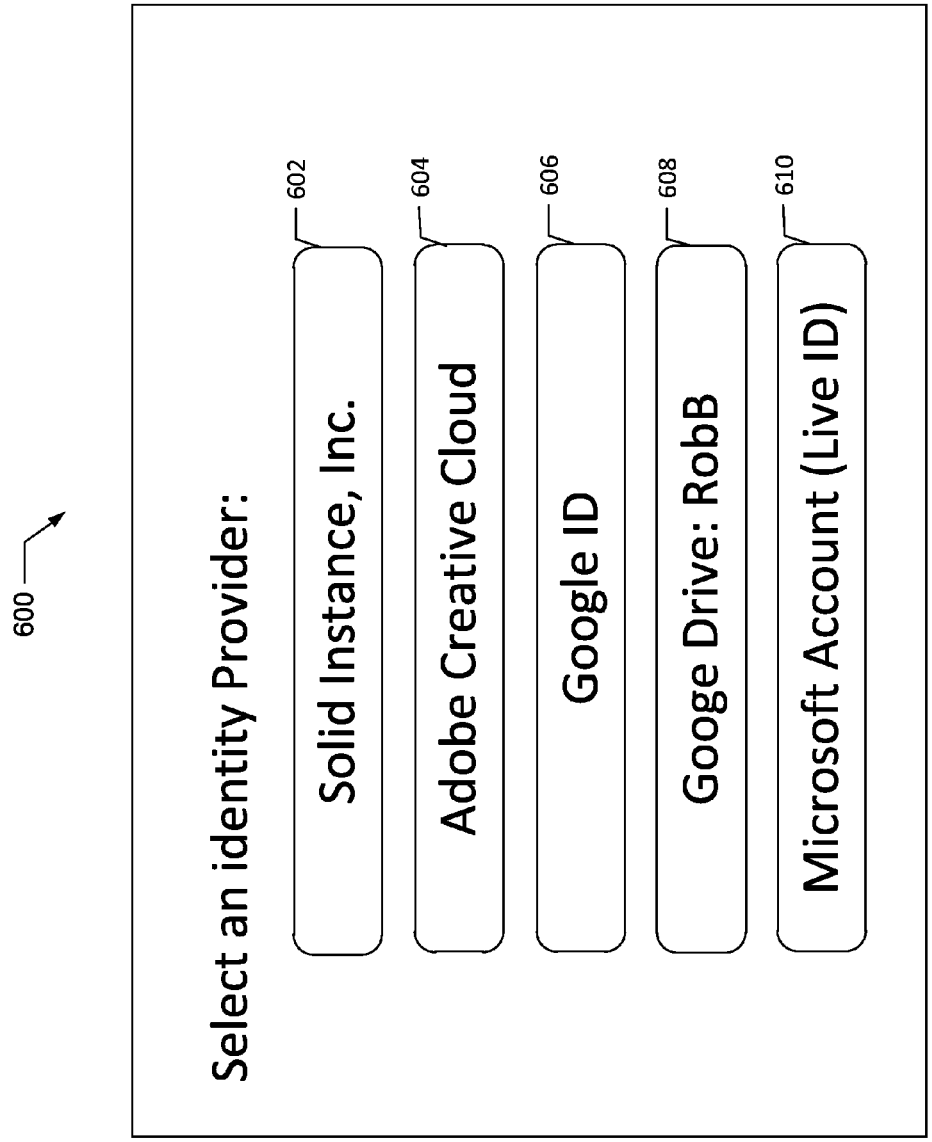
FIG. 6 is an example screenshot of the network gateway system, consistent with embodiments of the present disclosure.

FIG. 6 is an example screenshot 600 illustrating a list of supported third-party federated-ID providers, consistent with embodiments described herein. As shown in FIG. 6, there may be four, or a plurality of different identity providers: 602, 604, 606, 608 and 610. The client can choose, in some embodiments, any one of those providers to identify him or herself. For example, a client (e.g., application execution environment 402, or components thereof, of FIG. 4) can log into a third-party resource-storage provider (e.g., third-party resource providers 408 of FIG. 4), which can identify and/or authenticate the client.

Figure 7:
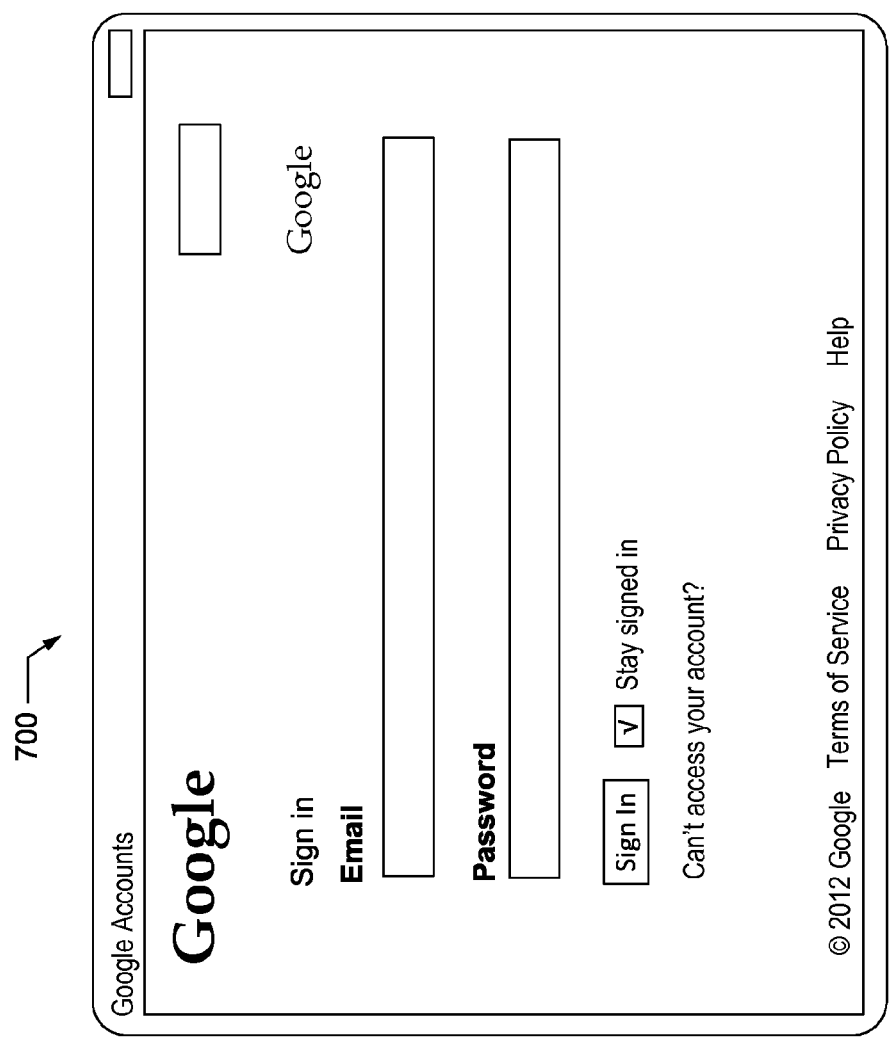
FIG. 7 is an example screenshot of the network gateway system, consistent with embodiments of the present disclosure.

FIG. 7 is an example screenshot of the client logging in at a federated ID provider, e.g., Google™, consistent with embodiments described herein. In some embodiments, a client is redirected to the federated identity-provider website as discussed in step 504 above for client authentication.

Figure 8:
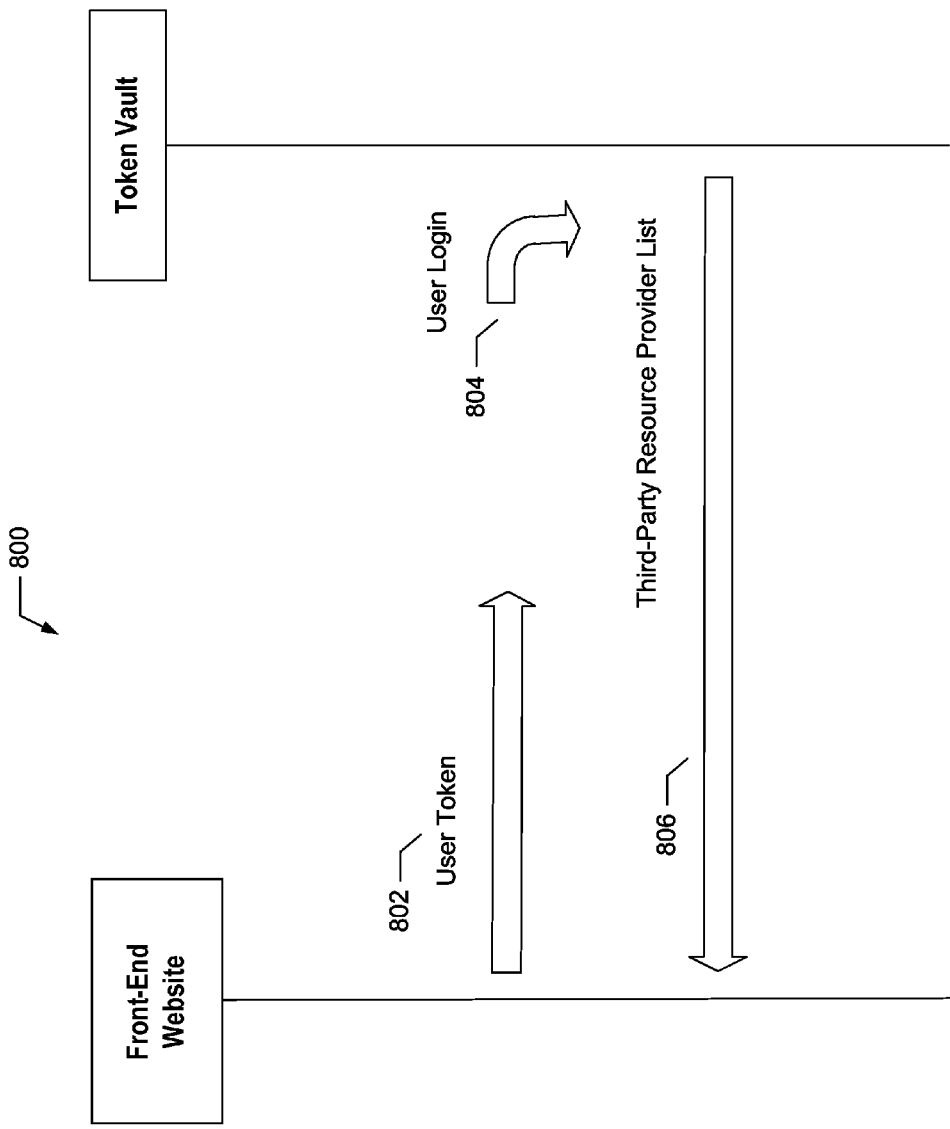
FIG. 8 is an example process for fetching a third-party resource list from the token vault, consistent with embodiments of the present disclosure.

FIG. 8 in an example a process 800 for fetching a third-party resource list from the token vault, consistent with embodiments described herein. As discussed above, in such embodiments, the client has been previously authenticated. The client accesses the token vault using the gateway access token, as shown in step 802. The client (e.g., user) login information is used to access the token vault (e.g., token vault 448 of FIG. 4) and the tokens associated with the client, as shown in step 804. The token vault returns a third-party resource-provider list as shown in step 806.

Figure 9:
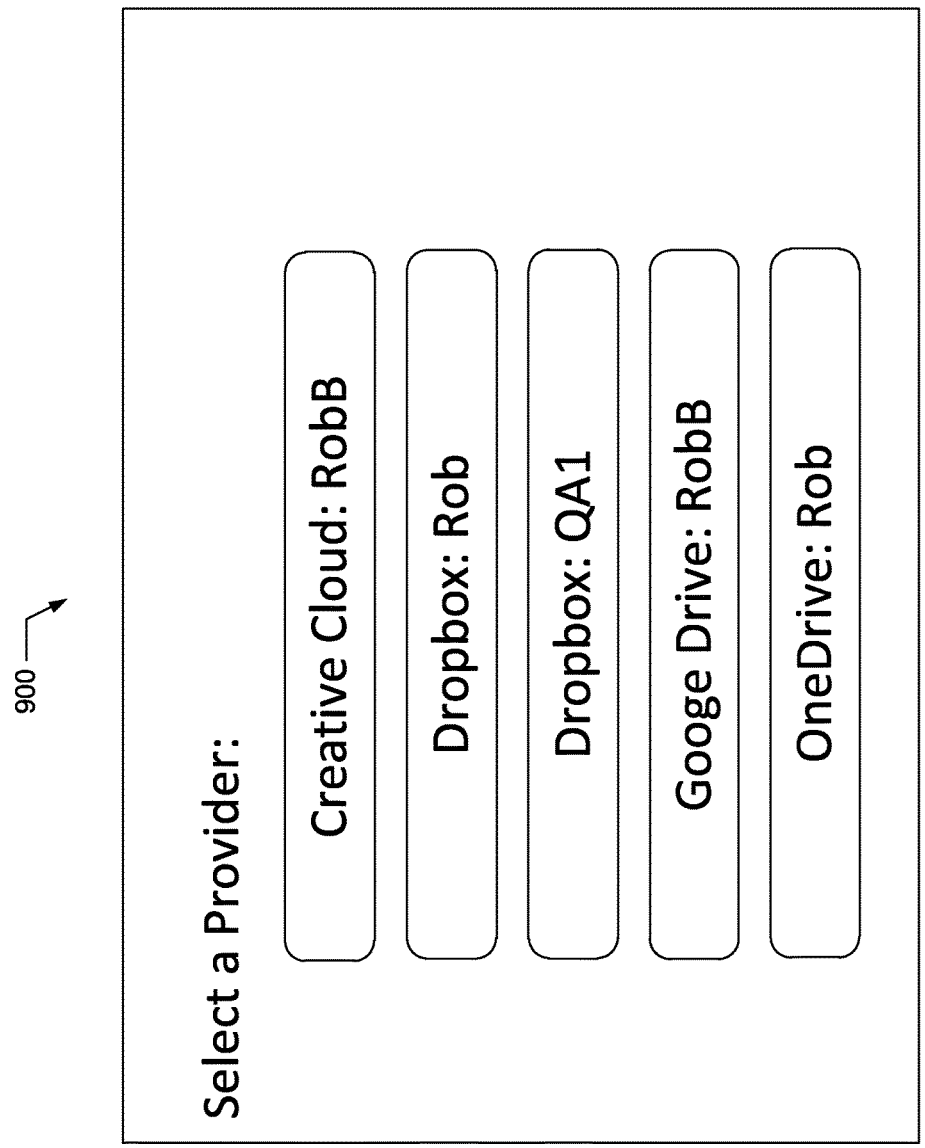
FIG. 9 is an example screenshot of a list of third-party resource providers, consistent with embodiments of the present disclosure.

FIG. 9 illustrating screenshot 900 is an example of available third-party resource providers for various clients, consistent with embodiments described herein. As shown in FIG. 9, a user Rob (e.g., a client) can access a variety of different storage providers, such as Creative Cloud™, Dropbox™, or Google™.

Figure 10:
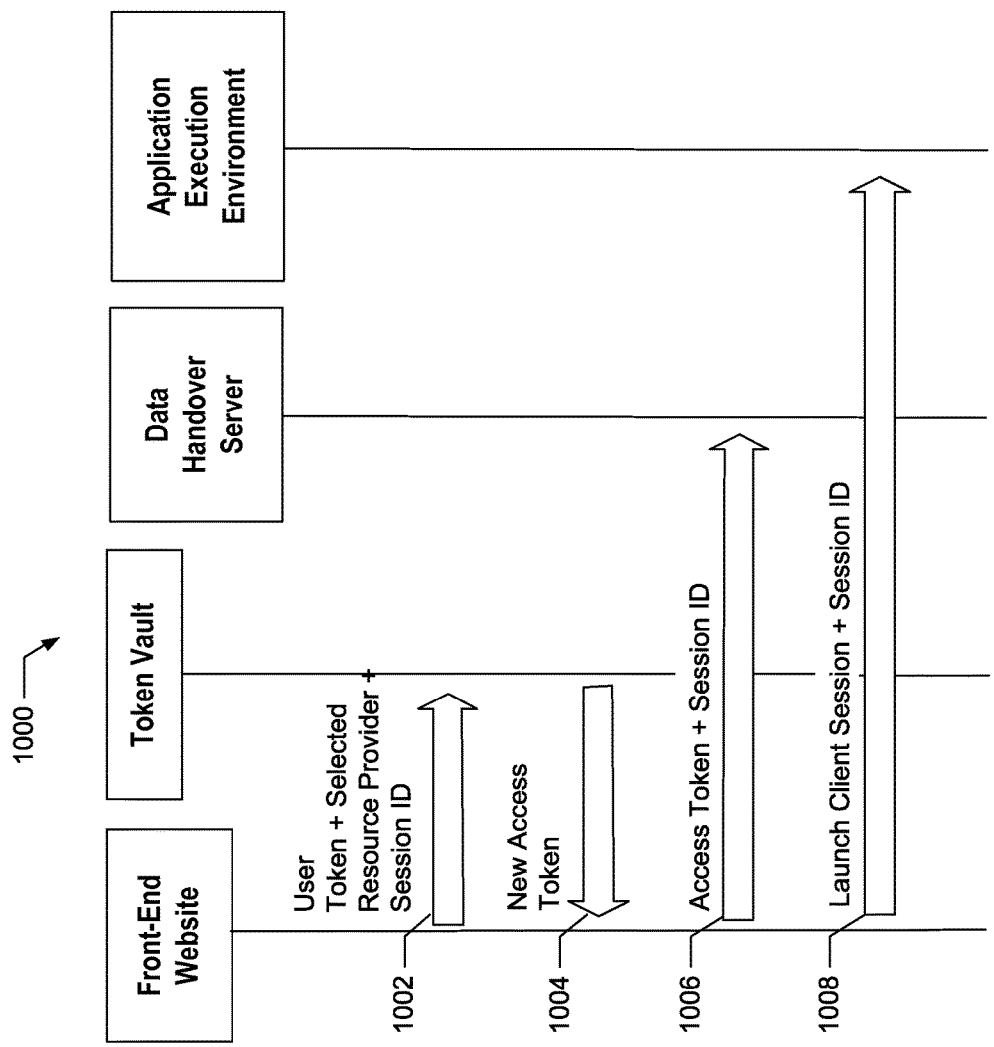
FIG. 10 is an example process for obtaining a gateway access token, consistent with embodiments of the present disclosure.

FIG. 10 is an example process 1000 generally illustrating how a client communicates with the token vault to access the token, consistent with embodiments described herein. As shown in process 1000, at step 1002 a front-end website can send a user token, a selected resource provider, and a session ID to the token vault. In step 1004, a token vault returns a new access token to the front-end website. As shown in step 1006, the front-end website can use the access token plus the session ID and access the data handover services (e.g., data handover services 450 of FIG. 4) in the network services.

Data handover services 450 are accessible inside and outside of the application execution environment. Data handover services can provide a place to store information that can accessed by both the front-end website and the launcher. The front-end website places the token in the data handover services area, so that the launcher, which only has information about the session ID, can access the token. Essentially, the gateway access token, that is given to the client in the client environment, can include the third-party resource-provider access token.

The third-party token can have an expiration time stamp and a session ID. In some embodiments, the third-party access token can expire after two weeks. In other embodiments, it may never expire. It should be appreciated that a third-party access token, if misplaced or put in the wrong hands, could cause a rather large security breach for an organization. Therefore, the network gateway encrypts the third-party token inside of a gateway access token, which does expire. Even if the gateway access token, which is sent to the client, is misplaced or lost, it will eventually expire, generally at the same time that the application execution environment session expires. After that expires, the network token is no longer in danger because the network token is not available as a standalone token. It is only available as part of the gateway access token.

It should be appreciated that while it is desirable that the gateway access token have a relatively short lifespan, e.g., the amount of time of a session, it is desirable to have a longer-lasting, persistent third-party token. A longer-lasting token means that the client does not have to frequently reauthenticate itself with the third-party resource provider.

At step 1008, the gateway access token is provided to the application execution environment. After, the client logged into the application execution environment can launch the virtual drive. In some example embodiments, after the client is logged into an application execution environment, the user can see a virtual drive as a folder on his or her computer.

Figure 11:
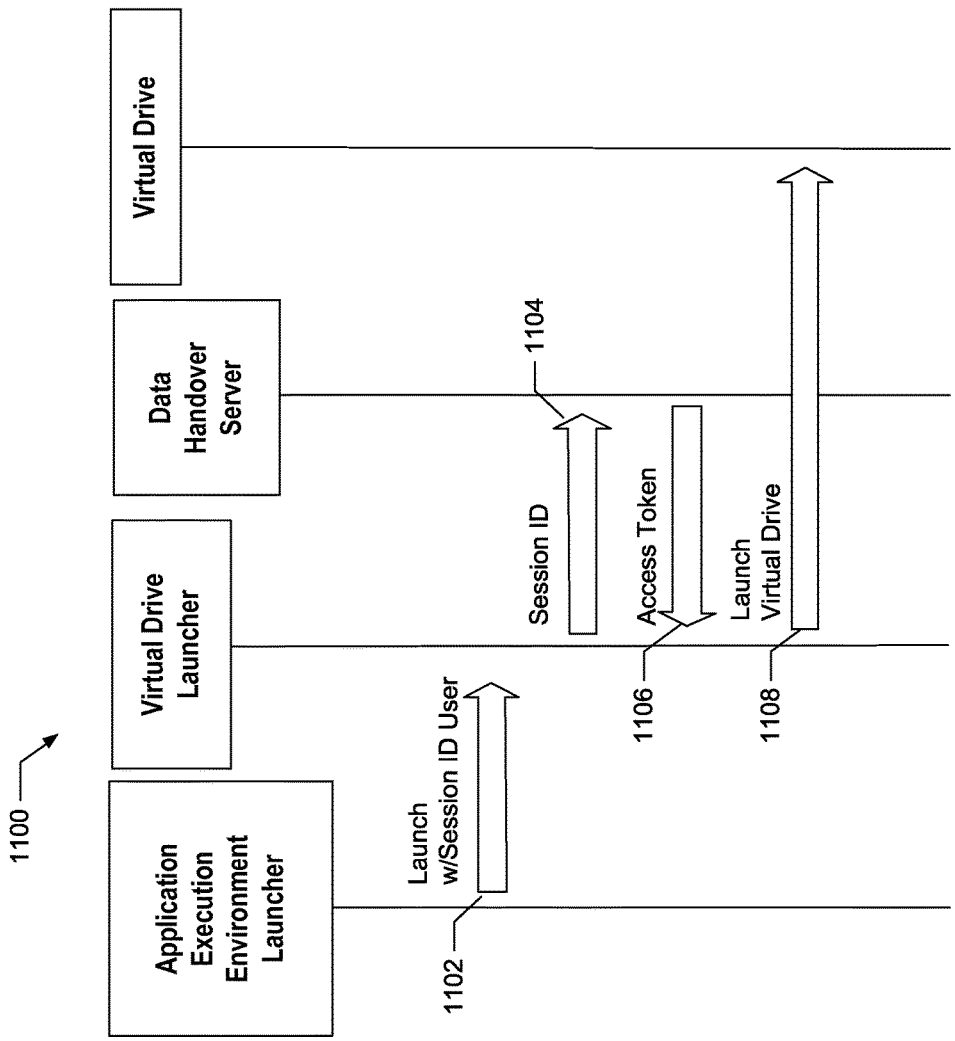
FIG. 11 is an example process for launching a virtual volume that accesses data from a third-party resource provider, consistent with embodiments of the present disclosure.

FIG. 11 shows an example process 1100, consistent with embodiments described herein. As shown in FIG. 11, step 1102 shows the application execution environment launcher launching the environment with a session ID, which communicates with the data handover services, as shown in step 1104. As previously discussed, a gateway access token is placed in the data handler services, so that is returned to the virtual drive (or volume, etc.) launcher in step 1106, where the launcher can now launch the virtual drive, which in this example embodiment is called Virtual Drive Launcher. In some embodiments, a launcher can be any instructions or device that can start a process, environment, drive, volume, etc. Further, in some embodiments, launchers can be the same or different launchers.

At step 1108, a virtual drive is launched. In some embodiments, a virtual drive launcher as shown in process 1100 can be included in, or otherwise associated with, the virtual drive that appears on a client's application execution environment. The user can browse that drive and see the hierarchy of the files in there, but the files will not be there until the client (e.g., the user) requests some of the files. When the client requests some of the files inside of a folder, that file is then cached for that client.

It should be appreciated that the client is essentially an anonymous client from the viewpoint of the network gateway. In some embodiments, the network gateway can give limited access to a client, which is why the third-party access token can be encrypted inside of the gateway access token.

Figure 12:
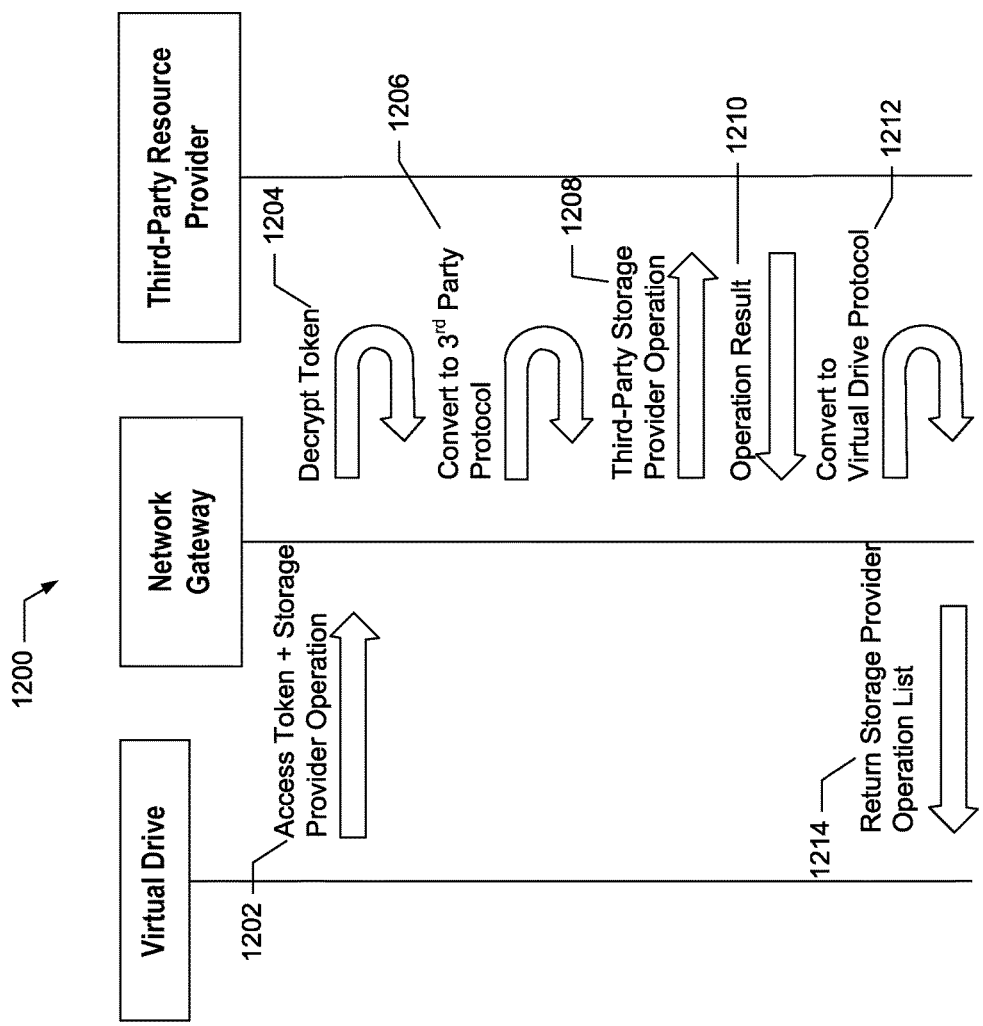
FIG. 12 is an example process illustrating a virtual drive or volume accessing a third-party resource provider, consistent with embodiments diment of the present disclosure.

FIG. 12 is an example process 1200, showing third-party resource access by a virtual drive, consistent with embodiments described herein. The virtual drive has the gateway access token, and it requests some operation related to the storage provider, as shown in step 1202. The network gateway decrypts the token, as shown in step 1204, and converts the token to a third-party protocol, as shown in step 1206. For example, if a client requested access to a storage provider using the gateway access token, the network gateway would decrypt the gateway access token and convert it into a custom protocol for that third-party resource provider. If the client attempts to access storage provider B, the client would request a different token, which would be encapsulated inside of the gateway access token, and then the network gateway would have decrypted that gateway access token into a custom request for storage provider B.

As shown in step 1208, the network gateway sends the operation request, converted to a form that the third party can understand, to the third-party resource provider. The third-party resource provider provides a result of that operation, as shown in step 1210, which is then converted to the virtual drive protocol, as shown in step 1212. As shown in step 1214, the result, or the list, of that operation is then returned to the virtual drive environment.

Figure 13:
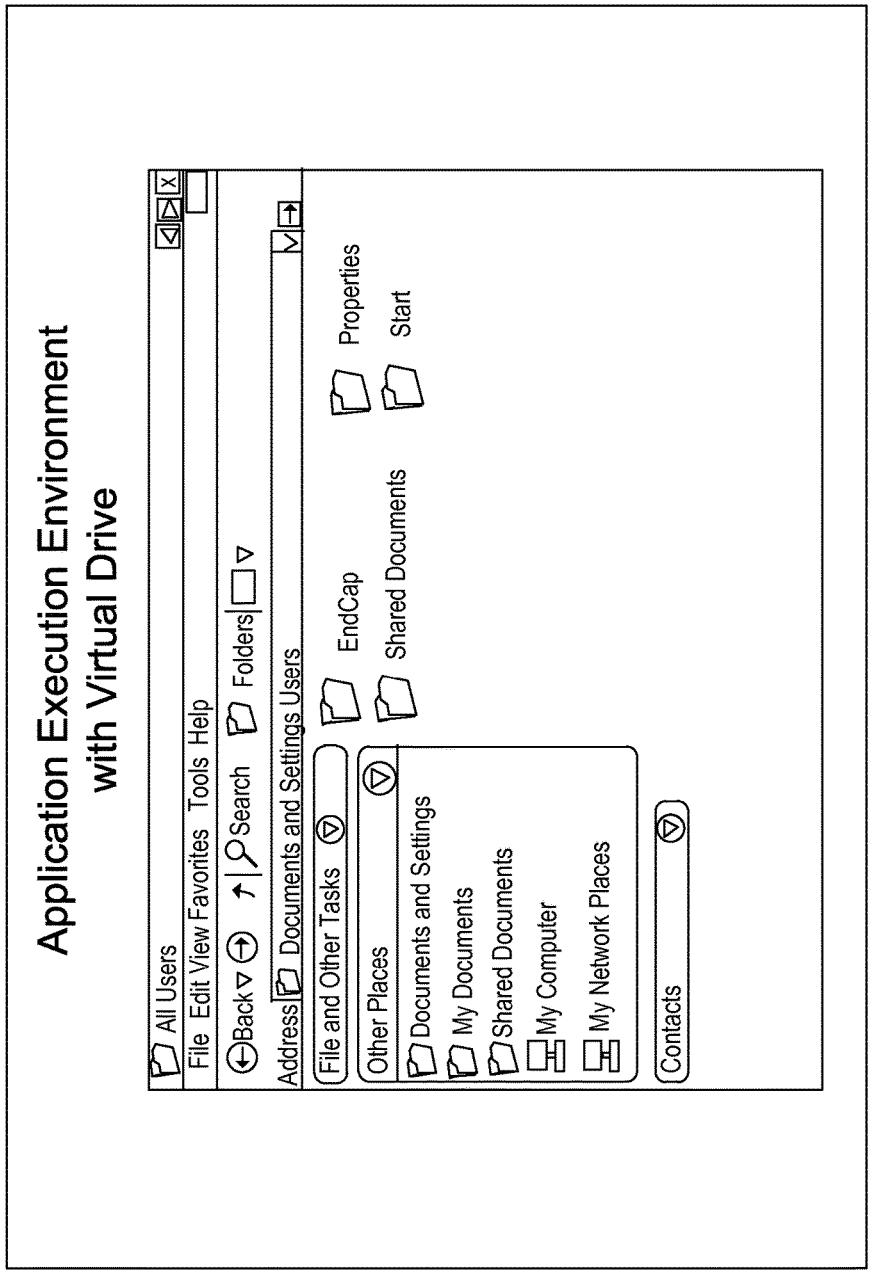
FIG. 13 is an example explorer view of a virtual volume, consistent with embodiments of the present disclosure.

FIG. 13 is an example screenshot 1300 of an explorer view of a virtual drive or volume, consistent with embodiments described herein. FIG. 13 illustrates an example client that displays data based on the responses that it receives from the network gateway (e.g., network gateway 404 in FIG. 4).

Figure 14:
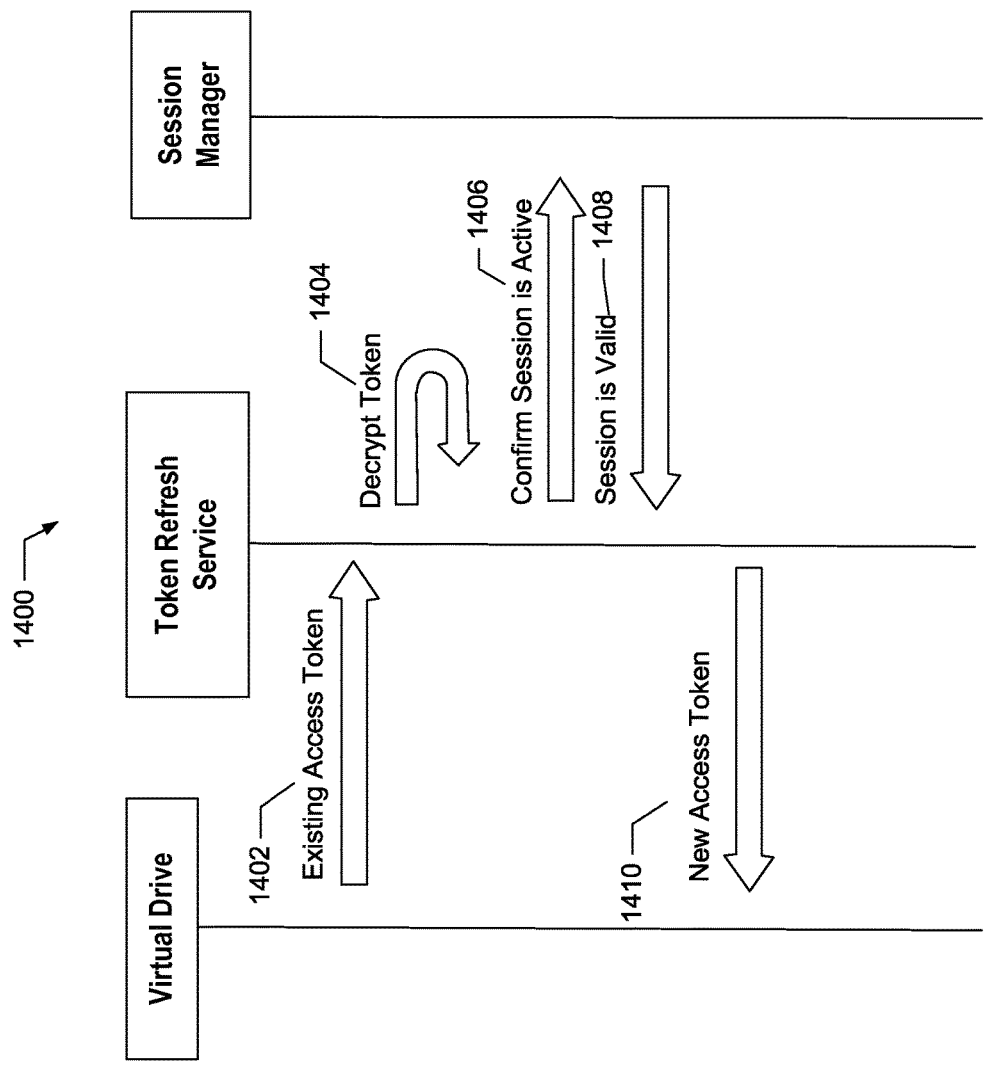
FIG. 14 is an example process illustrating a token refresh service, consistent with embodiments of the present disclosure.

FIG. 14 is an example process 1400 for refreshing an expired token, consistent with embodiments described herein. As previously discussed, some of the tokens can expire. In some embodiments, after a token expires, a token refresh service can provide the new access token. As shown in step 1402, an expired token is sent by the virtual volume, or drive, to the token refresh service. The token refresh service decrypts the token, as shown in step 1404, and confirms that the session is active by communicating with a session manager, as shown in step 1406. A session manager would then confirm, for example, that the session was still valid, as shown in step 1408, and the token refresh service would then provide a new access token that expires at some future date, or just refreshes the token, as shown in step 1410.

Figure 15:
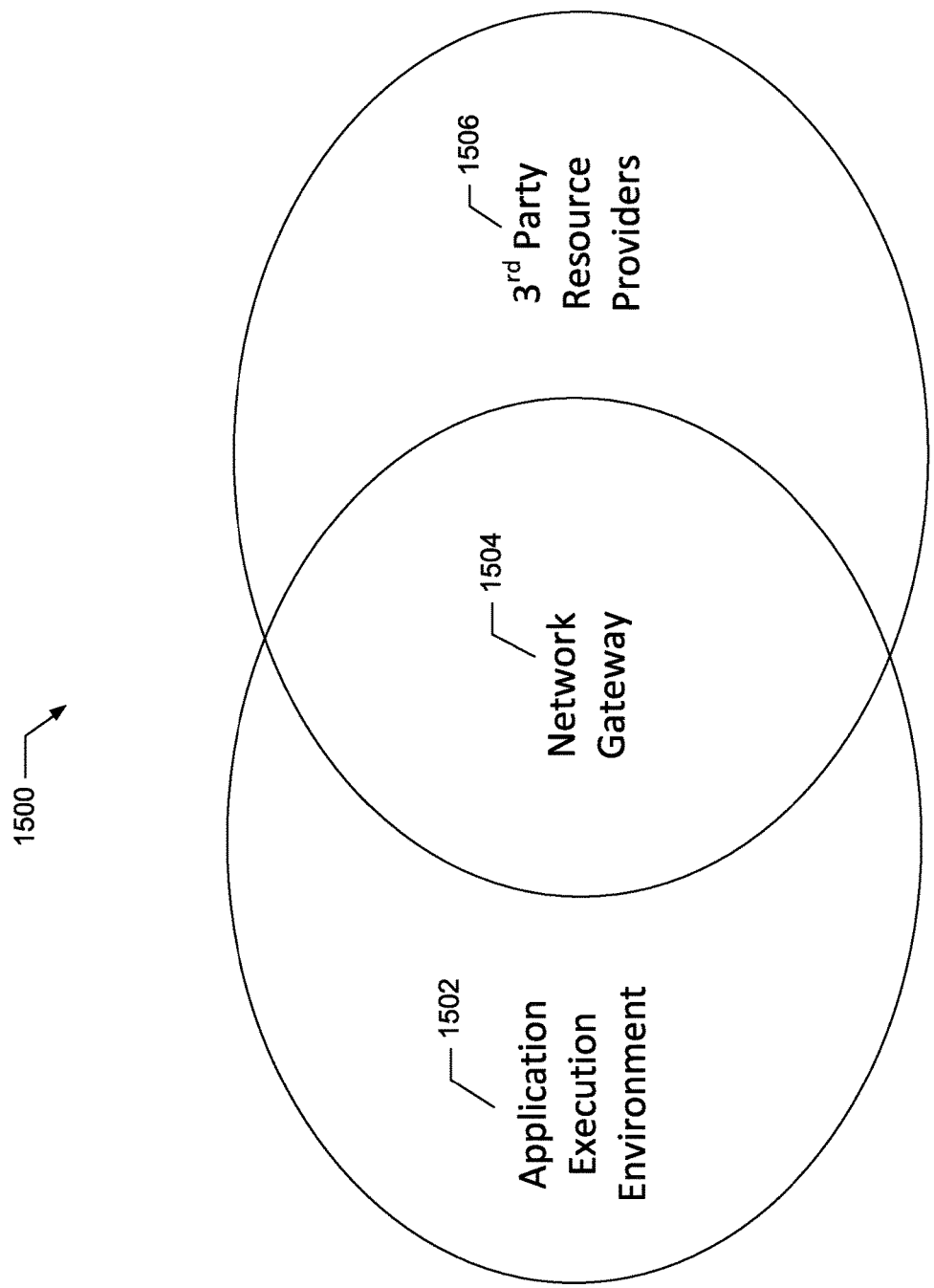
FIG. 15 is an example logical diagram illustrating a network gateway system, consistent with embodiments of the present disclosure.

FIG. 15 illustrates an example network gateway that provides separation of security domains, as shown in the high-level diagram 1500, consistent with embodiments described herein. It should be appreciated that the application execution environment 1502, and the third-party resource providers 1506, have distinct security domains. It can be advantageous to not allow tokens that are issued by third-party resource providers 1506 to be exposed to different security domains, such as an application execution environment 1502. In some embodiments, environment 1502 may have some company-related or client-related data that should not be exposed outside of its own environment 1502. In some embodiments, the network gateway 1504 (e.g., a GeoShadow™ gateway) acts as a gateway for requests traversing between the two domains and removes and replaces token information as appropriate.

In some embodiments, network gateway 1504 receives an initial login from a client and authenticates the client for the first environment, or the application execution environment. When a client from that environment, the application execution environment, desires to access an external storage system such as third-party resource provider 1506, the client can send a request to the network gateway 1504. Network gateway 1504 can access a token from the token vault based on an initial login and a request. Network gateway 1504 can convert the request into a second request for third-party resource providers 1506 (e.g., a file-storing system, a web service, etc.). The request can include the token that was received from the token vault. The network can then grant the client access to the data in the third-party resource system as needed. In some embodiments, the tokens can be requested prior to access, in which case the tokens are previously stored in the token vault.

Figure 16:
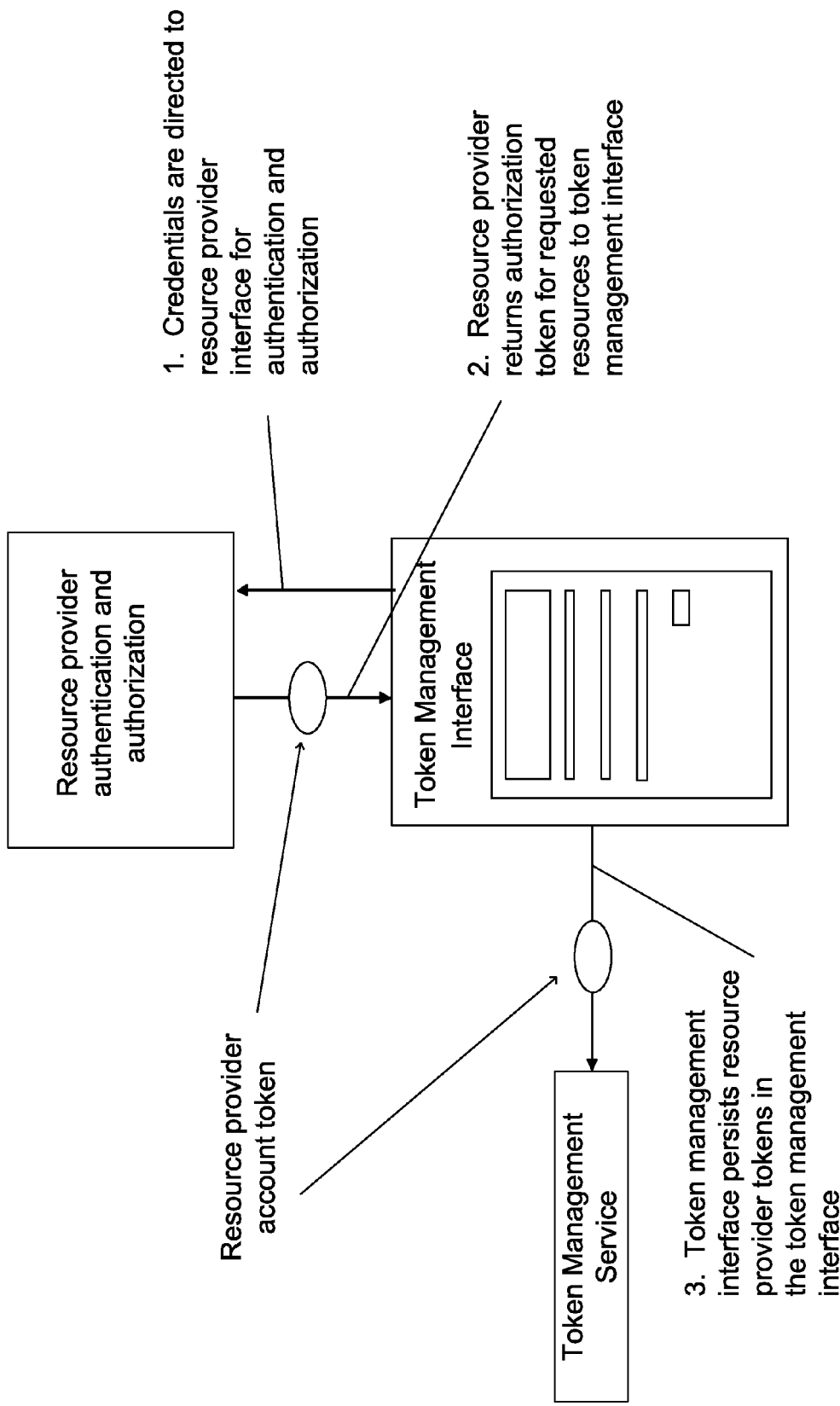
FIG. 16 illustrates an example diagram illustrating acquisition and persistence of file storage provider tokens, consistent with embodiments of the present disclosure.

FIG. 16 illustrates an example diagram illustrating acquisition and persistence of file storage provider tokens, consistent with embodiments described herein. First, in some embodiments, a client's (e.g., a user's) credentials is provided to a third-party resource provider for authentication and authorization. Next, the third-party resource provider can return an authorization token (e.g., a third-party access token) to a token management interface, which can be part of a network gateway). After, the token management interface stores (e.g., persists) resource provider tokens, and can store them in a token vault.

Figure 17:
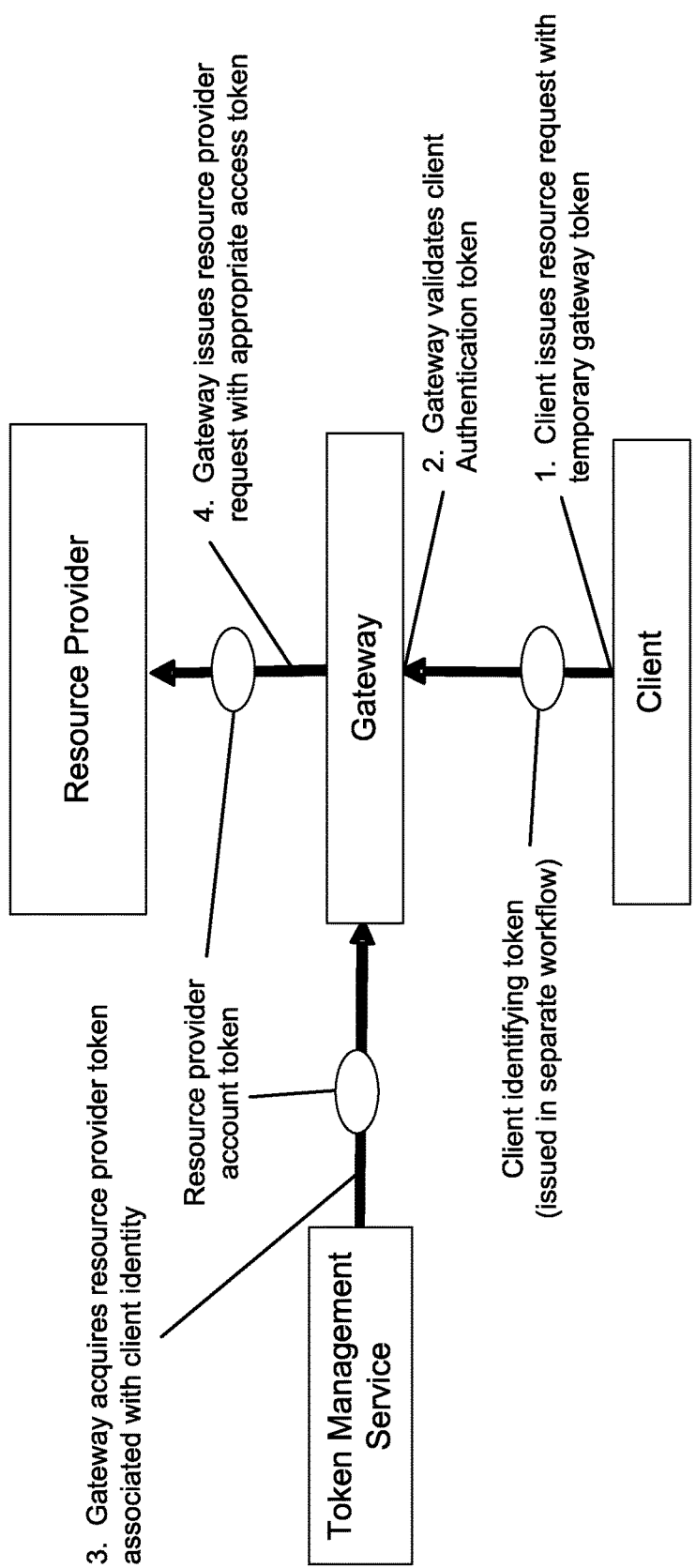
FIG. 17 illustrates an example use of a third-party resource provider token for access to third-party resource-provider data, consistent with embodiments of the present disclosure.

FIG. 17 illustrates an example use of a third-party resource-provider token for access to third-party resource-provider data, consistent with embodiments described herein. As illustrated, a client can provide a resource request with a temporary gateway token and a client token. A network gateway can then authenticate the client's token. After, a gateway can acquire a third-party resource-provider token associated with a client's identity from a token management service (e.g., a token vault). Next, the gateway can provide the third-party resource provider with the appropriate access token.

In some embodiments of the present disclosure, a method of granting a client access to an external system comprises: receiving an initial login from the client; authenticating the client for a first environment based upon the initial login; receiving a first request from the client for access to a first external system in a second environment; accessing a first token from a token vault based upon the initial login and the first request; converting the first request into a second request targeted to the external system, the second request including the first token; granting the client access to the first external system based upon the second request.

In some embodiments, access to the external system includes allowing the client to read data from and write data to the external system.

Further, in some embodiments, a method of granting a client access to an external system comprises: receiving an initial login from the client; authenticating the client for a first environment based upon the initial login; obtaining a token from the first environment to identify the client; requesting access to an external system in a second environment using the identity token; receiving an access token which includes an encrypted access token to the external system in a second environment; converting an access token request into an additional request targeted to the external system, the access token includes an encrypted form of the external system access token; and completing the client access to the external system based upon the initial access token request.

In the foregoing specification, embodiments have been described with reference to numerous specific details that can vary from implementation to implementation. Certain adaptations and modifications of the described embodiments can be made. The foregoing description has been presented for the purposes of illustration and description. It is not intended to be exhaustive or to limit the invention to the exemplary embodiments disclosed. Many modifications and variations are possible in light of the above teachings. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A device comprising:
   one or more processors;
   memory; and
   a network gateway configured to:
      acquire a first token from a client, the first token encrypting a second token, wherein the first token is used to access the network gateway and the second token is used to access a third-party resource provider, the network gateway granting access to the client based on at least the first token;
      provide the first token to a token management service, wherein the token management service is inaccessible to the client;
      decrypt the second token from the first token;
      request one of a refresh or replacement of the second token from the token management service, wherein the token management service is inaccessible to the client;
      receive the second token from the token management service;
      access the third-party resource provider using the second token; and
      grant the client access to the third-party resource provider.

2. The device of claim 1, wherein the second token includes information associated with the client.

3. The device of claim 1, wherein the client is included in a stateless device.

4. The device of claim 1, wherein the client requests a particular second token based on user input.

5. The device of claim 1, wherein the network gateway is further configured to:
   relay client requests to the third-party resource provider.

6. The device of claim 1, wherein the network gateway is further configured to:
   replace the first token with the second token to provide the client with access to the third-party resource provider.

7. A method for accessing a resource provider, the method being performed by one or more processors and comprising:
   acquiring a first token from a client the first token encrypting a second token, wherein the first token is used to access a network gateway and the second token is used to access a third-party resource provider, the network gateway granting access to the client based on at least the first token;
   providing the first token to a token management service, wherein the token management service is inaccessible to the client;
   decrypting the second token from the first token;
   requesting one of a refresh or replacement of the second token from the token management service, wherein the token management service is inaccessible to the client;
   receiving the second token from the token management service;
   accessing the third-party resource provider using the second token; and
   granting the client access to the third-party resource provider.

8. The method of claim 7, wherein the second token includes information associated with the client.

9. The method of claim 7, wherein the client is included in a stateless device.

10. The method of claim 7, wherein the client requests a particular second token based on user input.

11. The method of claim 7, further comprising: relaying client requests to the third-party resource provider.

12. The method of claim 7, further comprising:
   replacing the first token with the second token to provide the client with access to the third-party resource provider.

13. A non-transitory computer readable storage medium storing a set of instructions that are executable by at least one processor of a computer, to cause the computer to perform a method for accessing a resource provider, the method comprising:
   acquiring a first token from a client, the first token encrypting a second token, wherein the first token is used to access a network gateway and the second token is used to access a third-party resource provider, the network gateway granting access to the client based on at least the first token;
   providing the first token to a token management service, wherein the token management service is inaccessible to the client;
   encrypting the second token from the first token;
   requesting one of a refresh or replacement of the second token from the token management service, wherein the token management service is inaccessible to the client;
   receiving the second token from the token management service;
   accessing the third-party resource provider using the second token; and
   granting the client access to the third-party resource provider.

14. The non-transitory computer readable storage medium of claim 13, wherein the client is included in a stateless device.

15. The non-transitory computer readable storage medium of claim 13, wherein the client requests a particular second token based on user input.

16. The non-transitory computer readable storage medium of claim 13, wherein the method further comprises:
   relaying client requests to the third-party resource provider.

17. The non-transitory computer readable storage medium of claim 13, wherein the method further comprises:
   replacing the first token with the second token to provide the client with access to the third-party resource provider.

\* \* \* \* \*